United States Patent
Muraoka et al.

(10) Patent No.: US 6,213,562 B1
(45) Date of Patent: Apr. 10, 2001

(54) BICYCLE WHEEL WITH REINFORCED RIM

(75) Inventors: Tsutumo Muraoka, Sakai; Shinpei Okajima, Izumi, both of (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/352,115

(22) Filed: Jul. 13, 1999

(51) Int. Cl.[7] .............................. B60B 1/02; B60B 21/06
(52) U.S. Cl. ................................................ 301/61; 301/55
(58) Field of Search .................. 301/55, 56, 58, 301/59, 61 I

(56) References Cited

U.S. PATENT DOCUMENTS

| | | | | |
|---|---|---|---|---|
| 1,483,398 | * | 2/1924 | Whitehead | 301/58 |
| 2,937,905 | * | 5/1960 | Altenburger | 301/58 |
| 5,445,439 | * | 8/1995 | Dietrich | 301/55 |
| 5,452,945 | * | 9/1995 | Schlanger | 301/58 |
| 5,499,864 | * | 3/1996 | Klein et al. | 301/58 |
| 5,651,591 | | 7/1997 | Mercat et al. | 301/95 |
| 6,024,413 | * | 2/2000 | Dixon et al. | 301/55 |
| 6,036,279 | * | 3/2000 | Campagnolo | 301/55 |
| 6,068,347 | * | 5/2000 | Okajima et al. | 301/55 |
| 6,126,243 | * | 10/2000 | Okajima et al. | 301/58 |

FOREIGN PATENT DOCUMENTS

| | | |
|---|---|---|
| 4200227 | 7/1993 | (DE) . |
| 19729824 | 1/1998 | (DE) . |
| 0715001B | 3/1999 | (EP) . |
| 2101541 | 1/1983 | (GB) . |
| 8207503 | 8/1996 | (JP) . |
| 2560978 | 10/1997 | (JP) . |
| 10-230701 | 9/1998 | (JP) . |

* cited by examiner

Primary Examiner—S. Joseph Morano
Assistant Examiner—Jason R. Bellinger
(74) Attorney, Agent, or Firm—Shinjyu Global IP Counselors, LLP

(57) ABSTRACT

A bicycle wheel basically has a hub, a plurality of spokes extending outwardly from the hub and an annular rim coupled to the outer ends of the spokes for supporting a tire. The annular rim has a spoke attachment portion with a plurality of openings for receiving the outer ends of the spokes therein. The openings of the annular rim have reinforcement members or washers located between the spokes and annular rim. The outer ends of the spokes have bent sections located within the spoke holes of the reinforcement members or washers and head section that engage the inner surface of the reinforcement members or washers. The rim is provided with a reinforcing rib or bend above each of the spoke holes. The reinforcing rib or bend can be continuous or discontinuous. The spoke attachment portions of the rim are divided into an outer circumferential section, a middle circumferential section with the spoke openings formed therein and an inner circumferential section. At least parts of the middle circumferential sections of the spoke attachment portions have a first predetermined wall thickness located above and below the spoke openings. The first predetermined wall thicknesses of these parts are greater than a second predetermined wall thickness of the inner circumferential sections of the spoke attachment portions.

44 Claims, 12 Drawing Sheets

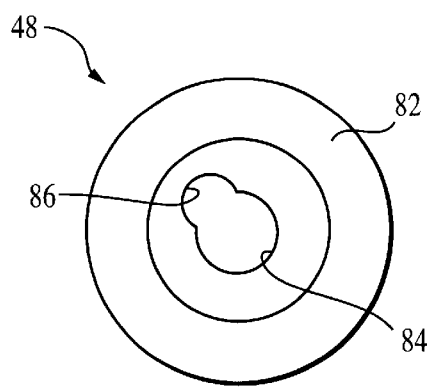
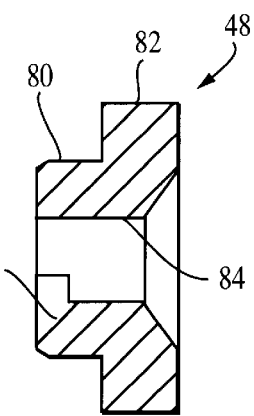
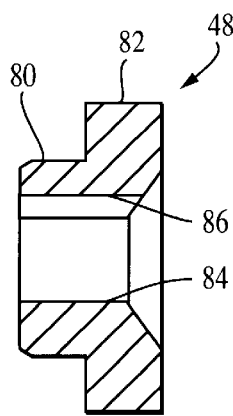
FIG. 11   FIG. 12   FIG. 13
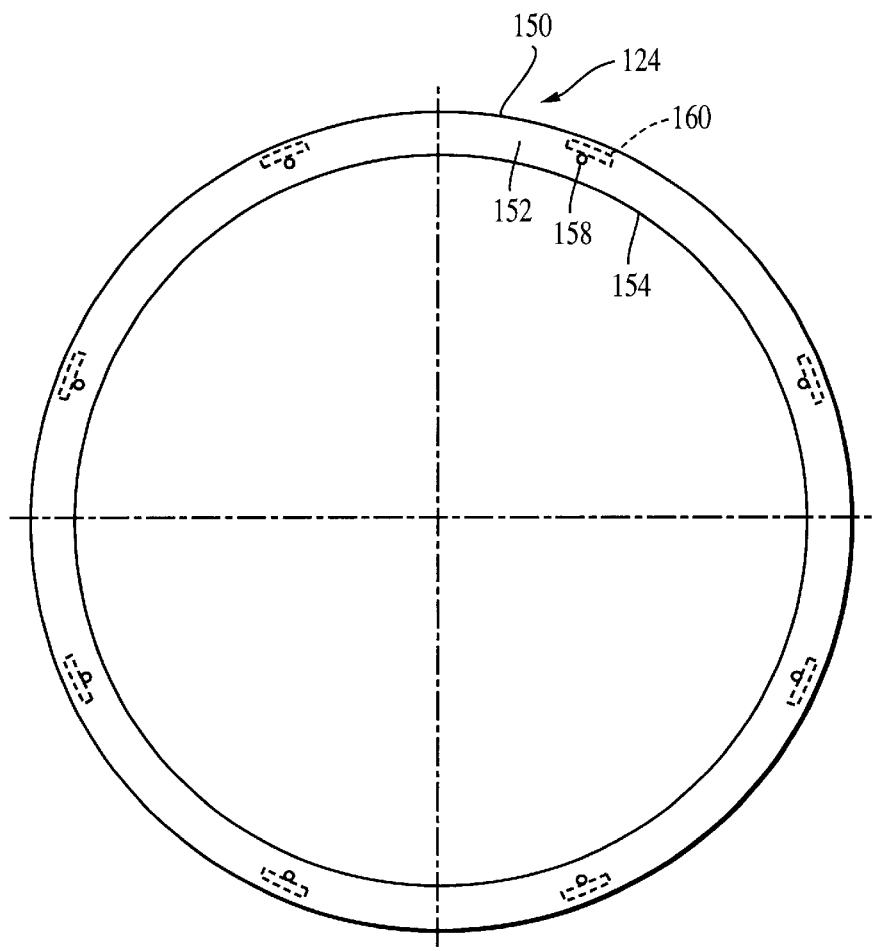
FIG. 14

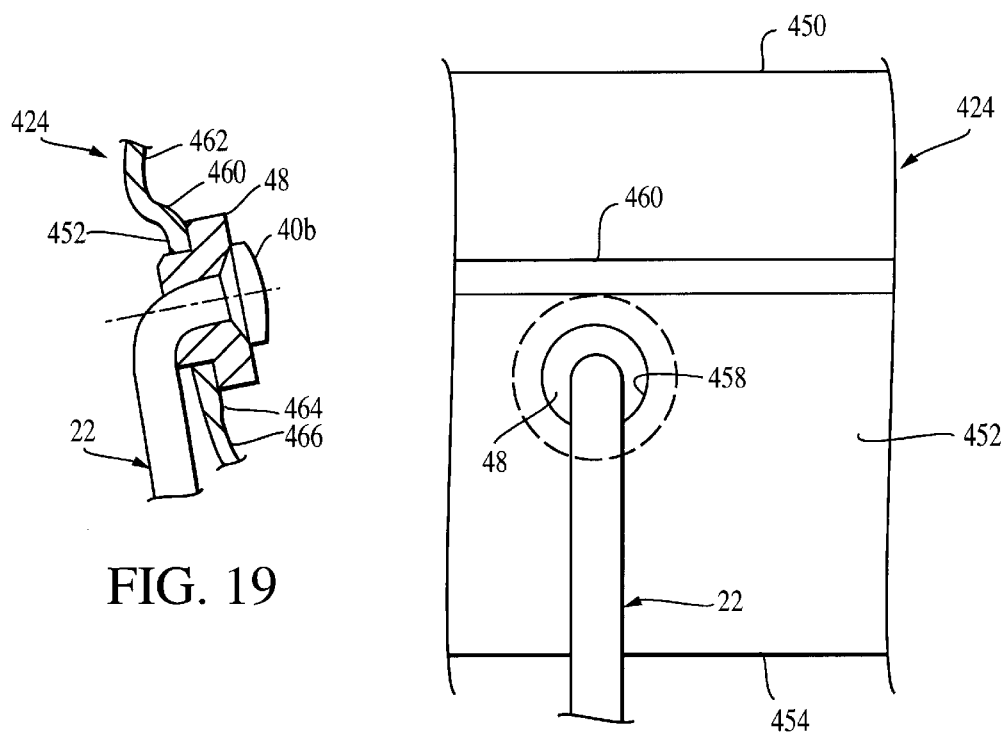
FIG. 19
FIG. 20
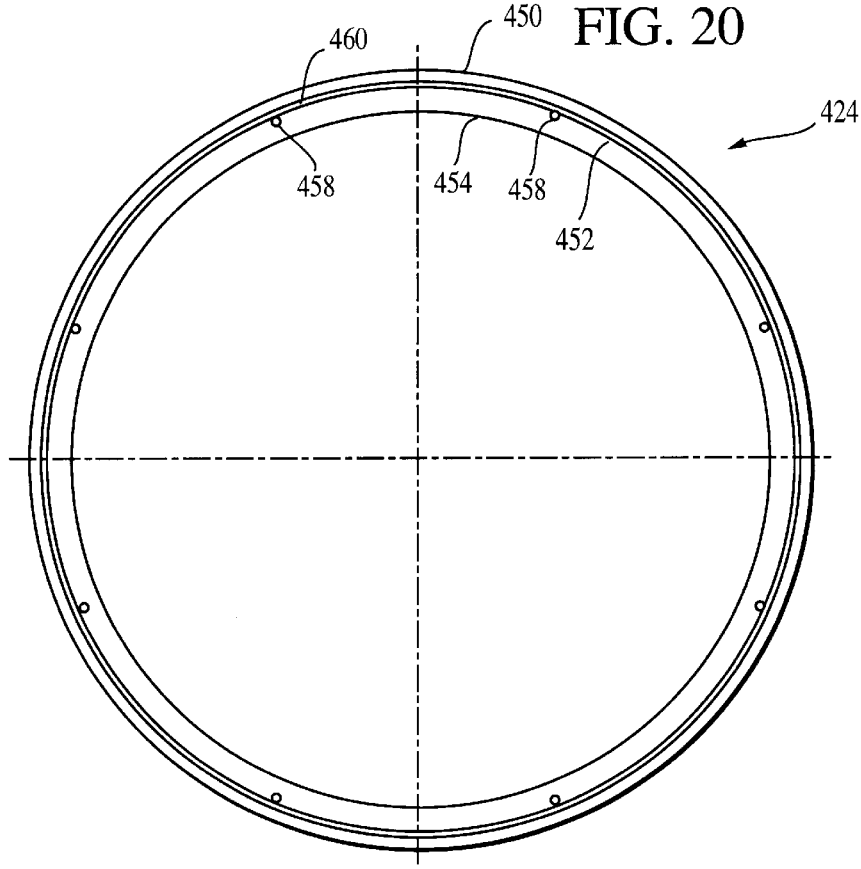
FIG. 21

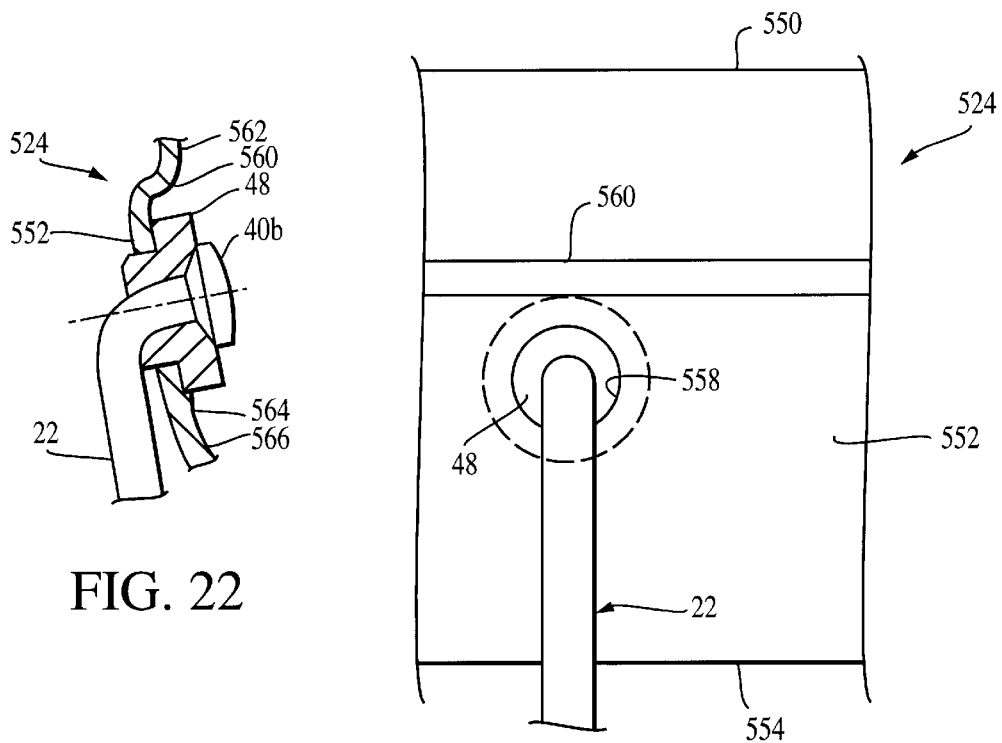
FIG. 22
FIG. 23
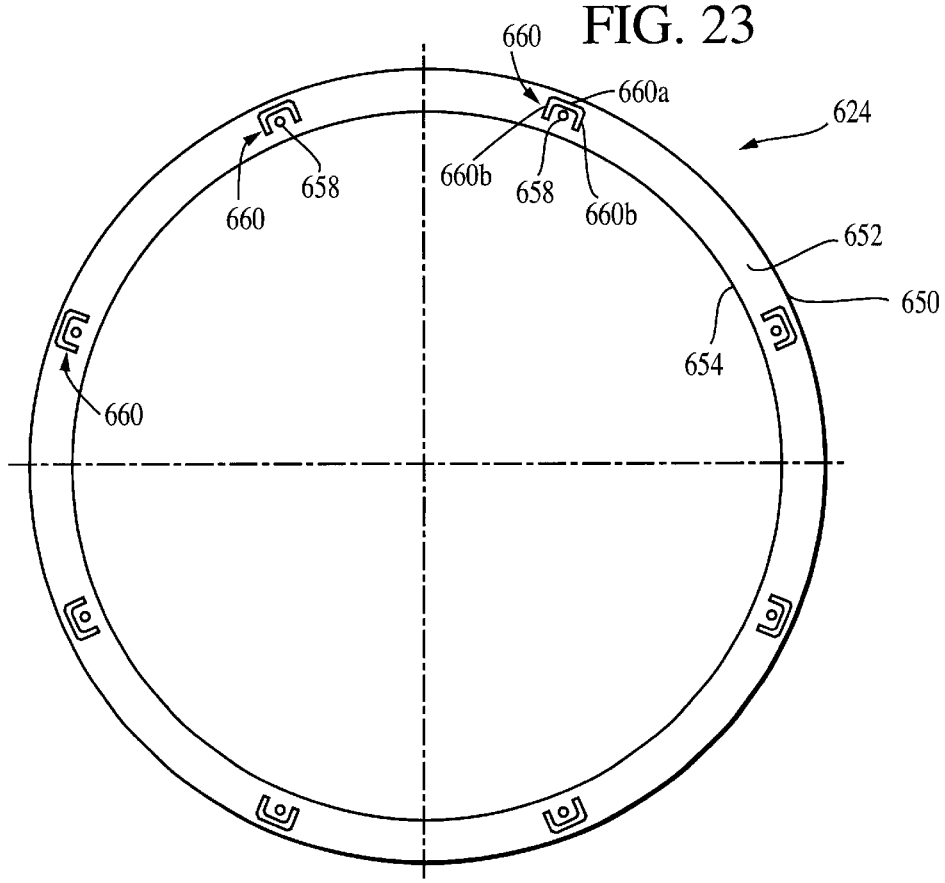
FIG. 24

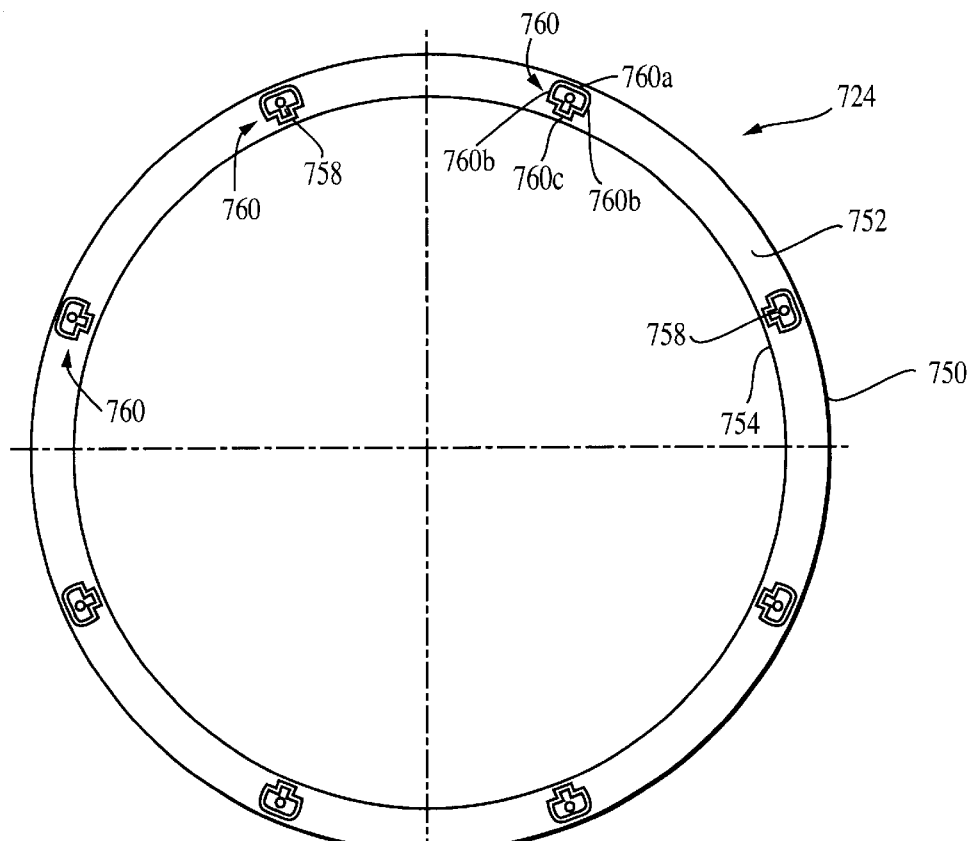
FIG. 25
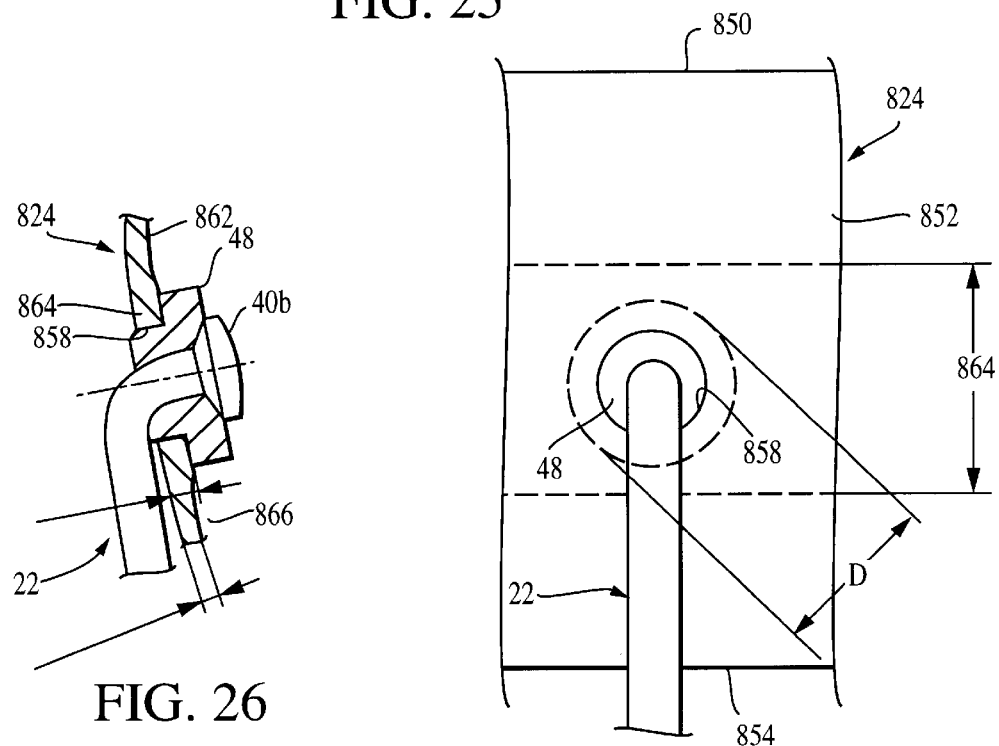
FIG. 26
FIG. 27

BICYCLE WHEEL WITH REINFORCED RIM

BACKGROUND OF THE INVENTION

1. Field of the Invention

This invention generally relates to a bicycle wheel having an annular rim with a plurality of spokes extending inwardly from the rim to a hub. More specifically, the present invention relates to a reinforced rim in which the outer end portions of the spokes are mounted to the side faces of the rim.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging spoke nipples, which secure the inner ends of the wire spokes to the hub.

With a spoke constructed in this manner, the nipples are installed in nipple holes formed in either the rim or the hub. The spokes are inserted through holes in either the hub flange or the rim with the flanges of the spokes engaging the areas surrounding the holes in either the hub flange or the rim. The male threads on the ends of the spokes are threaded into the female threads of the spoke nipples installed in the openings of the hub flange or the rim. It is desirable in the bicycle industry to have as few spokes as possible. One problem with conventional spokes is the concentrated stress applied to the rim. Moreover, if fewer spokes are used, the stress on the rim becomes increasingly larger.

In view of the above, there exists a need for a bicycle rim that overcomes the above mentioned problems in the prior art. This invention addresses this need in the prior art as well as other needs, which will become apparent to those skilled in the art from this disclosure.

SUMMARY OF THE INVENTION

One object of the present invention is to provide a rim for a bicycle wheel that is relatively durable.

Another object of the present invention is to provide a rim for a bicycle wheel, which is lightweight in design.

Another object of the present invention is to provide a rim for a bicycle wheel that can withstand the stress of having a relatively small number of spokes extending between the rim and the hub.

Another object of the present invention is to provide a bicycle wheel, which can be relatively easy to manufacture by conventional manufacturing techniques.

Still another object of the present invention is to provide a bicycle wheel, which is relatively inexpensive to manufacture in comparison to other performance bicycle wheels.

The foregoing objects can basically be attained by providing a bicycle rim, comprising an outer annular portion, first and second annular spoke attachment portions and an inner annular portion. The outer annular surface is adapted to receive a tire thereon. The first and second annular spoke attachment portions are coupled to the outer annular portion and located radially inwardly of the outer annular portion. The inner annular portion is located radially inwardly of the first and second annular spoke attachment portions for coupling the first and second annular spoke attachment portions together to form a hollow interior. Each of the first and second annular spoke attachment portions has an outer circumferential section, a middle circumferential section with a plurality of circumferentially arranged spoke openings formed therein and an inner circumferential section. At least parts of the middle circumferential sections of the first and second annular spoke attachment portions have a first predetermined wall thickness located above and below the spoke openings. The first predetermined wall thickness of the parts is greater than a second predetermined wall thickness of the inner circumferential sections of the first and second annular spoke attachment portions.

In a bicycle rim of the present invention, the parts of the middle circumferential sections with the first predetermined wall thickness can form a continuous annular ring along each of the first and second annular spoke attachment portions. Alternatively, the bicycle rim of the present invention can have the parts of the middle circumferential sections with the first predetermined wall thickness being discontinuous. In the case of discontinuous reinforced areas, each of the reinforced areas can encircle one of the spoke openings.

In a preferred embodiment of the present invention, the reinforced middle circumferential sections of the bicycle rim form annular rings having radial widths of approximately 4.0 millimeters to approximately 16.0 millimeters. Preferably, the annular rings are radially centered relative to the spoke openings.

In accordance with another aspect of the present invention, the first predetermined wall thickness of the parts of the rim is at least approximately 1.33 times greater than the second predetermined wall thickness of the inner circumferential sections of the first and second annular spoke attachment portions. Moreover, each of the outer circumferential sections preferably has a third predetermined wall thickness that is substantially equal to the second predetermined wall thicknesses of the inner circumferential sections of the first and second annular spoke attachment portions.

In a bicycle rim of the present invention, the reinforcing elements can extend continuously along the first and second annular spoke attachment portions or can be a plurality of discrete reinforcing elements that are formed on each of the first and second annular spoke attachment portions in a discontinuous pattern. Moreover, the reinforcing elements can be formed on either the interior or exterior surfaces of the first and second annular spoke attachment portions.

In accordance with one aspect of the present invention, the reinforcing elements are ribs that are located radially and outwardly from the spoke openings. In accordance with another aspect of the present invention, the reinforcing elements are bends that have at least a portion or part located radially and outwardly from the spoke openings. The ribs or bends extend continuously along the first and second annular spoke attachment portions or can be a plurality of discrete reinforcing elements that are formed on each of the first and second annular spoke attachment portions in a discontinuous pattern.

In accordance with another aspect of the present invention, the reinforcing elements are located within an area of approximately 8.0 millimeters from the spoke openings in a radially outward direction.

Also providing a bicycle wheel assembly comprising a plurality of outwardly extending spokes and an annular rim can further attain the foregoing objects. The spokes have an inner end portion, an outer end portion, and a center portion located between the inner and outer end center portions. Each of the outer end portions of the spokes has an enlarged head member. The rim comprising an outer annular portion, first and second annular spoke attachment portions and an inner annular portion. The outer annular surface is adapted to receive a tire thereon. The first and second annular spoke attachment portions are coupled to the outer annular portion and located radially inwardly of the outer annular portion. The inner annular portion is located radially inwardly of the first and second annular spoke attachment portions for coupling the first and second annular spoke attachment portions together to form a hollow interior. Each of the first and second annular spoke attachment portions has an outer circumferential section, a middle circumferential section with a plurality of circumferentially arranged spoke openings formed therein and an inner circumferential section. At least parts of the middle circumferential sections of the first and second annular spoke attachment portions have a first predetermined wall thickness located above and below the spoke openings. The first predetermined wall thickness of the parts is greater than a second predetermined wall thickness of the inner circumferential sections of the first and second annular spoke attachment portions.

In accordance with another aspect of the present invention, the inner ends of the spokes have a central portion coupled thereto. The central portion has an axial bore that is adapted to receive a hub assembly therein and a plurality of spoke attachment parts.

In accordance with another aspect of the present invention, the bicycle wheel assembly has a plurality of reinforcement members located on the outer end portions of the spokes and being located in spoke openings. The reinforcement members have a first portion with a first radial width and a second portion with a second radial width that is larger than said first radial width. The first portions of reinforcement members are located within the spoke openings of the annular rim. The reinforcing elements are radially spaced from the spoke openings in areas that are approximately 0.25 to approximately 1.0 times the first radial width of the first portions of reinforcement members.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 11 is an enlarged left side elevational view of the reinforcement member or washer illustrated in FIGS. 9 and 11;

FIG. 12 is a longitudinal cross-sectional view of the reinforcement member or washer illustrated in FIGS. 9–11 as seen along section line 12—12 of FIG. 9;

FIG. 13 is a longitudinal cross-sectional view of the reinforcement member or washer illustrated in FIGS. 9–12 as seen along section line 13—13 of FIG. 9;

FIG. 14 is a diagrammatic side elevational view of a modified bicycle rim in accordance with a second embodiment of the present invention;

FIG. 19 is a side elevational view of a modified bicycle rim in accordance with fifth embodiment of the present invention;

FIG. 20 is a partial, side elevational view of a portion of the bicycle wheel illustrated in FIG. 19;

FIG. 21 is a diagrammatic side elevational view of the bicycle rim illustrated in FIGS. 19 and 20;

FIG. 22 is a partial, cross-sectional view of a modified bicycle rim in accordance with sixth embodiment of the present invention;

FIG. 23 is a partial, side elevational view of a portion of the bicycle wheel illustrated in FIG. 22 in accordance with the present invention;

FIG. 24 is a diagrammatic side elevational view of a bicycle rim in accordance with seventh embodiment of the present invention;

FIG. 25 is a diagrammatic side elevational view of a bicycle rim in accordance with eighth embodiment of the present invention;

FIG. 26 is a partial, cross-sectional view of a modified bicycle rim in accordance with ninth embodiment of the present invention;

FIG. 27 is a partial side elevational view of a portion of the bicycle rim illustrated in FIG. 26;

DETAILED DESCRIPTION OF THE PREFERRED EMBODIMENTS

Figure 1:
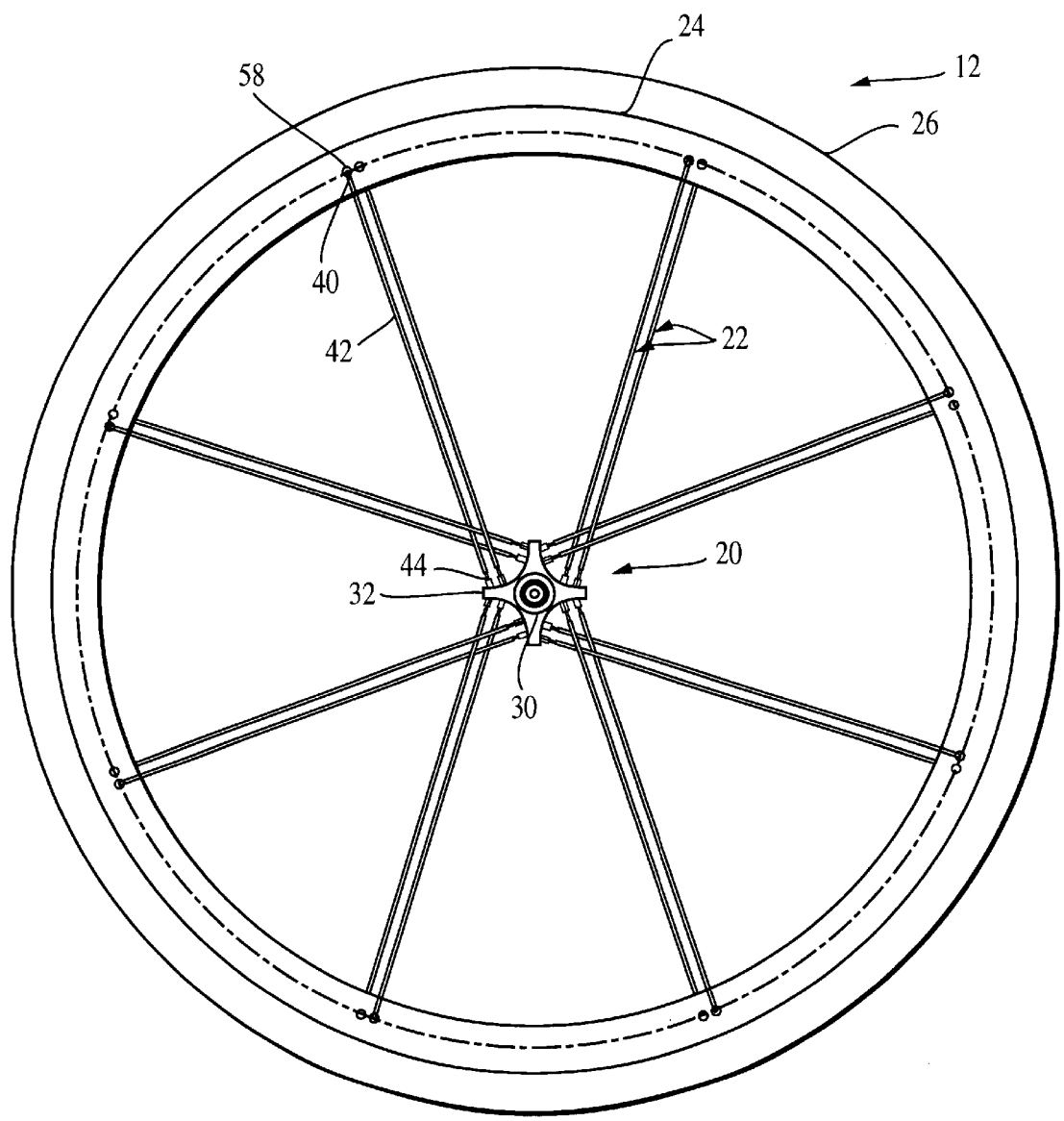
FIG. 1 is a side elevational view of a front bicycle wheel with a front hub, sixteen spokes and a rim in accordance with a first embodiment of the present invention.
Figure 2:
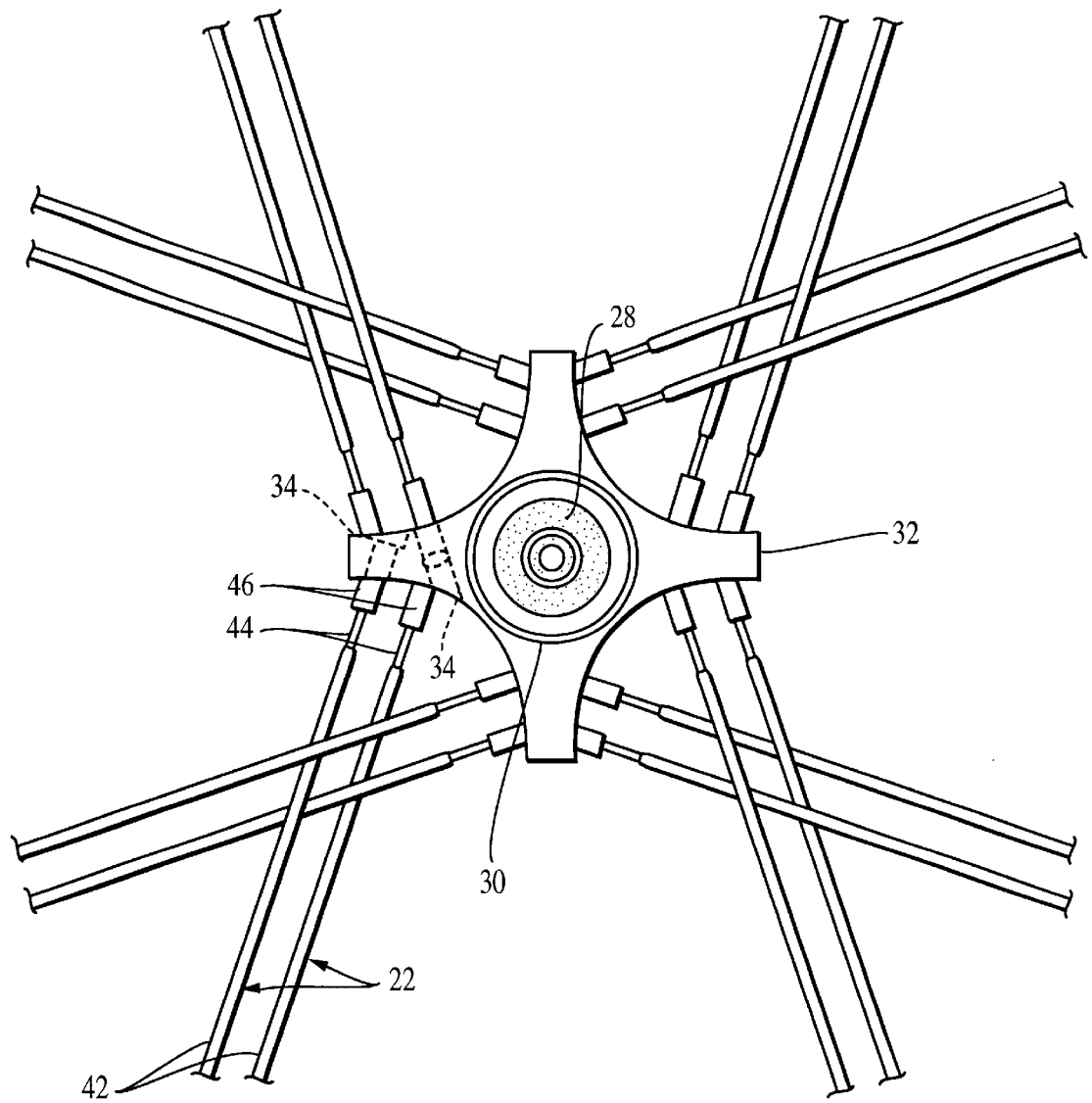
FIG. 2 is a partial, enlarged elevational view of the front bicycle hub illustrated in FIG. 1 with the inner end portions of the spokes coupled thereto.
Figure 3:
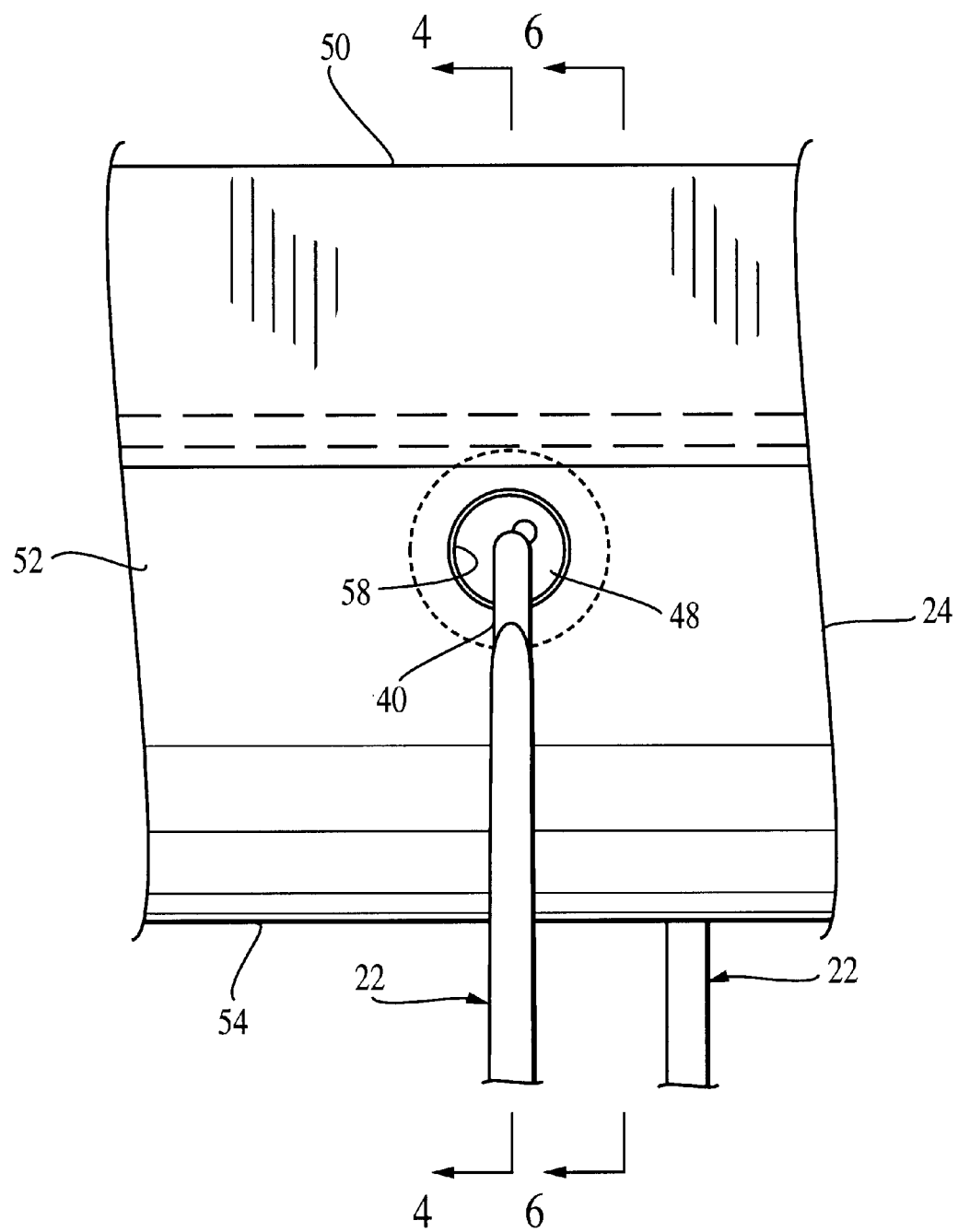
FIG. 3 is an enlarged, partial side elevational view of a portion of the front bicycle wheel illustrating the connection between the rim and two of the spokes of the bicycle wheel illustrated in FIG. 1.

Referring initially to FIGS. 1 and 2, a bicycle wheel 12 in accordance with the present invention is illustrated in accordance with the present invention. Bicycle wheel 12 can be utilized as either a front bicycle wheel or a rear bicycle wheel. Accordingly, it will be apparent to those skilled in the art from this disclosure that the description pertaining to the construction of bicycle wheel 12 applies to either a front bicycle wheel or a rear bicycle wheel.

Bicycle wheel 12 has a central hub or central mounting portion 20, a plurality of outwardly extending spokes 22 and an annular rim portion 24 with a pneumatic tire 26 coupled thereto in a conventional manner. In the illustrated embodiment shown herein, bicycle wheel 12 has sixteen spokes 22 extending radially between central hub 20 and annular rim portion 24. Of course, it will be apparent to those skilled in the art from this disclosure that the bicycle wheel 12 can have fewer or more spokes 22 than illustrated if needed and/or desired.

As seen in FIGS. 1 and 2, hub 20 has a tubular body section 30 with a pair of end flanges 32 for mounting spokes 22 thereto. Each end flange 32 has four spoke attachment points with holes 34 for coupling spokes 22 thereto. Tubular body section 30 has an axial bore that is adapted to receive a hub assembly 28 therein.

The number and shape of the spoke attachment points of end flanges 32 will depend upon the number of spokes and their shapes. Accordingly, it will be apparent to those skilled in the art from this disclosure that other types and shapes of hubs can be utilized in connection with the present invention.

As seen in FIGS. 1–4, each of the spokes 22 has an outer end portion 40, a center or middle portion 42 and an inner end portion 44. Outer end portions or spoke heads 40 are coupled to rim 24 by reinforcement members or washers 48 as discussed below. Reinforcement members or washers 48 are designed to disperse the stresses applied to rim 24 by spokes 22.

Straight center portion 42 is located radially inwardly of outer end portion 40, and inner end portion 44 located radially inwardly of the center portion 42. Inner end portion 44 is coupled to hub 20 in a relatively conventional manner. Preferably, outer end portion 40, center portion 42 and inner end portion 44 are constructed as a unitary, one-piece member with spoke nipples 46 theadedly coupled to the inner end portion 44 of each of the spokes 22 for connection to hub 20.

Figure 4:
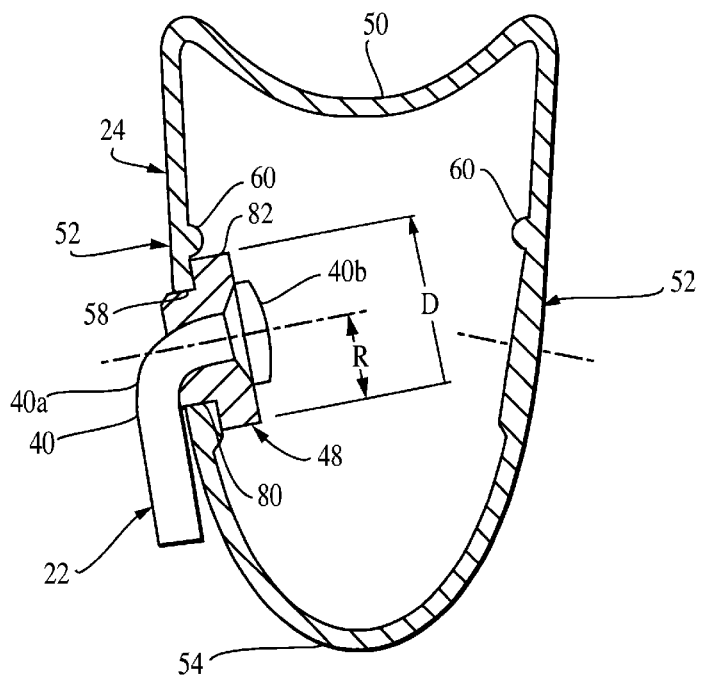
FIG. 4 is a partial, cross-sectional view of the bicycle rim as seen along section line 4—4 of FIG. 3 with one of the reinforcement members of the bicycle wheel illustrated in cross-section and one of the spokes illustrated in elevation.

As best seen in FIG. 4, in this embodiment, outer end portions 40 of spokes 22 have a bent section 40a with an enlarged head 40b at the free end of bent section 40a. Bent section 40a has a circular cross-section of a predetermined width or diameter. The head 40a has a larger width or diameter to secure spoke 22 to rim 24 via reinforcement member or washer 48. Center portions 42 and inner end portions 44 each have a circular or elliptical cross section. Of course, it will be apparent to those skilled in the art that the entire length of spokes 22 can be substantially uniform along its entire cross section if needed and/or desired. It will also be apparent to those skilled in the art that constant cross section spokes can be utilized or spokes with a varying cross section can be utilized as needed and/or desired.

Figure 6:
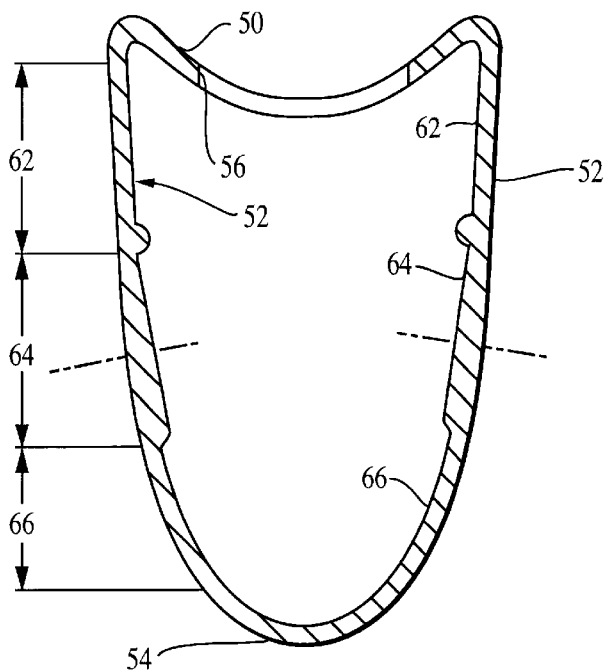
FIG. 6 is a partial, cross-sectional view of the bicycle rim as seen along section line 6—6 of FIG. 3 with the spokes and reinforcement member removed from the rim for the purposes of illustration.
Figure 7:
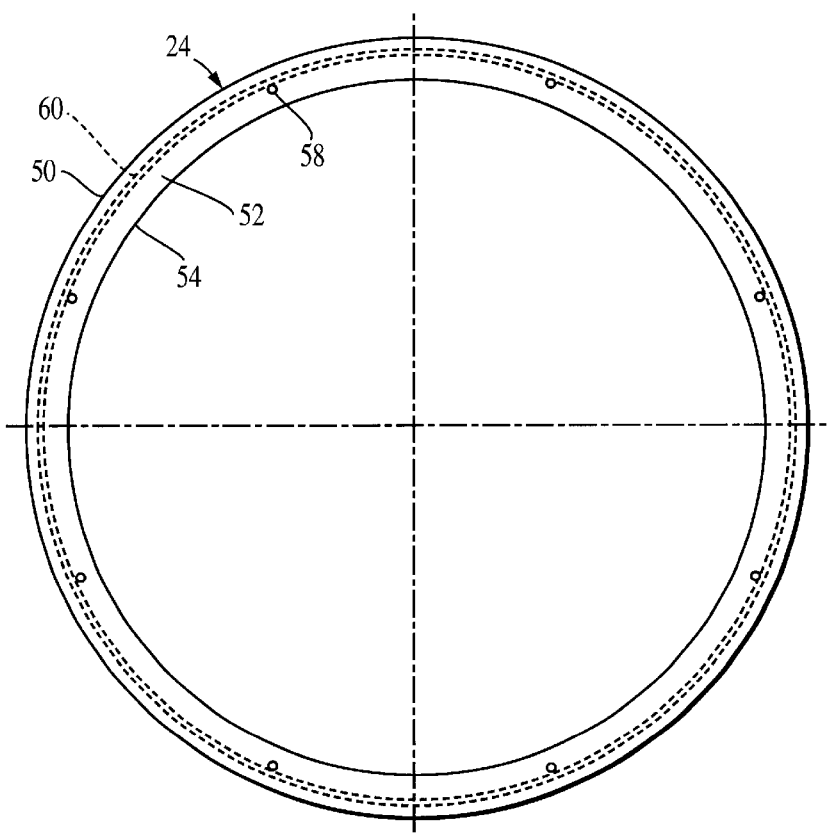
FIG. 7 is a diagrammatic side elevational view of the rim illustrated in FIGS. 1–7 showing a continuous reinforcing element or rib in broken lines.

As seen in FIGS. 4, 6 and 7, outer end portions 40 of spokes 22 are bent to form heads 40b at the free ends of spokes 22 which are offset from the bent sections 40a. Of course, it will be apparent to those skilled in the art from this disclosure that outer end portions 40 can be bent or formed to have a different shape and/or cross section than the illustrated shapes and cross sections. In any event, the shapes and cross sections of bent section 40a and head 40b of each spoke should be configured to prevent axial movement of the spoke relative to rim 24 when the spoke is in the installed position.

Center portions 42 of spokes 22 are illustrated as being substantially straight wire type spokes with substantially elliptical cross sections. However, it will be apparent to those skilled in the art from this disclosure that center portions 42 of spokes 22 can be configured to have other types of cross sections and/or shapes. For example, center portions 42 can be circular or more rectangular in cross section with the shape being uniformed along the entire length of center portion 42. Alternatively, the cross section of center portion 42 can vary along its length such that the cross section of center portion 42 becomes wider as it approaches hub 20. In other words, the thickness and/or width of center portion 42 can be either uniformed or varied as needed and/or desired.

Referring again to FIG. 2, inner end portions 44 of spokes 22 are threaded for receiving conventional spoke nipples 46 thereon. More specifically, inner end portions 44 of spokes 22 are inserted through one end of bores 34 of hub 20, and then spoke nipples 46 are inserted through the other end of bores 34. The headed or flanged portion of the spoke nipples 46 engage an internal abutment surface of bores 34 to fixedly secure inner end portions 44 of spokes 22 to hub 20. Accordingly, spokes 22 can be tightened in a substantially conventional manner between hub 20 and rim 24 to secure inner end portions 44 of spokes 22 thereto.

Figure 5:
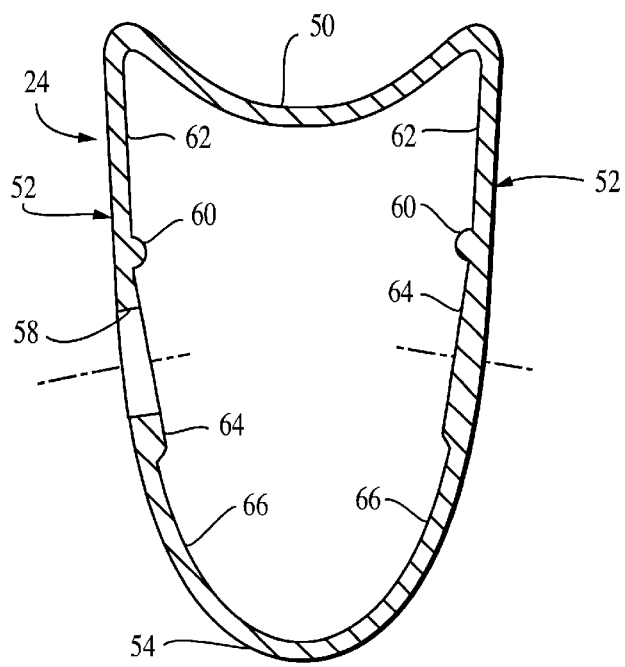
FIG. 5 is a partial, cross-sectional view of the bicycle rim as seen along section line 4—4 of FIG. 3 with the spoke and reinforcement member removed from the rim for purposes of illustration.

Referring now to FIGS. 4–6, the rim 24 is a so-called deep rim in which the rim's radial height is greater than the rim's axial width. Rim 24 is designed to have pneumatic tire 26 fastened thereto by a rim cement. It will be apparent to those skilled in the art that the shape of rim 24 could be modified to accommodate different types of tires such as "clinchers" as needed and/or desired. Of course, rim 24 can have other shapes to accommodate other types of tires as needed and/or desired without departing from the scope of the present invention. Rim 24 is constructed of a substantially rigid material, such as those materials, which are well known in the art. For example, rims 24 can be constructed of any suitable metallic material, such as plated steel, stainless steel, aluminum, magnesium or titanium, as well as other non-metallic materials, such as a carbon fiber composite, which can be utilized for a bicycle wheel.

Rim 24 is substantially circular as seen in side elevation (FIG. 1), and has an outer annular portion 50, a pair of annular spoke attachment portions 52 and an inner annular portion 54. The outer annular portion 50 is adapted to receive pneumatic tire 26 thereon. Outer annular portion 50 of rim 24 has a plurality of access apertures 56 for inserting spokes 22 therethrough and into spoke openings 58 of annular spoke attachment portions 52.

The annular spoke attachment portions 52 are located radially inward of outer annular portion 50, as seen in FIG. 4, with inner annular portion 54 connecting annular spoke attachment portions 52 together. Rim 24 is a tubular member with a hollow, annular inner area. In the preferred embodiment, outer annular portion 50 of rim 24 is designed for use with "tubular" or "sew-up" type tires which are cemented to outer annular portion 50.

Spoke attachment portions 52 are located radially inwardly relative to outer annular portion 50 of the rim 24. Each spoke attachment portion 52 has a plurality of circumferentially spaced spoke openings 58 for receiving spokes 22 with reinforcement members or washers 48 therein. Reinforcement members or washers 48 are designed to disperse the stresses applied to rim 24 by spokes 22.

In this embodiment, the plurality of spoke openings 58 are preferably circular openings that are larger than the outer end portions 40 of the spokes 22 therein. Spoke openings 58 of the present invention are larger than conventional spoke openings. Therefore, reinforcement members or washers 48 distribute the forces on rim 24 over a greater area than ordinary round spokes such that stress fracturing and/or tearing of rim 24 is minimized. Preferably, openings 58 have circumferential widths or diameters of at least approximately 5.0 millimeters.

Each spoke opening 58 is located adjacent one of the access apertures 56 so that a spoke 22 with a reinforcement member 48 can be inserted through access aperture 56 and into spoke opening 58. Access apertures 56 are preferably circular openings with a width or diameter of approximately 9.0 millimeters or larger. In any event, the width or diameter of access apertures 56 should be at least the width or diameter of reinforcement members 48, e.g., at least approximately 8.0 millimeters.

Each of the spoke attachment portions 52 is provided with a reinforcing element 60 that is located radially outwardly of the spoke openings 58. In this embodiment, reinforcing elements 60 are a pair of continuous ribs that are located on the interior surfaces of spoke attachment portions 52. Reinforcing elements 60 are located to strengthen the sides of rim 24. While reinforcing elements 60 are located on the interior surfaces of spoke attachment portions 52 in this embodiment, it will be apparent to those skilled in the art from this disclosure, the reinforcing elements 60 can be located on the exterior surfaces of the spoke attachment portions 52. In any case, the reinforcing elements or ribs 60 are located radially and outwardly from the spoke openings 58.

Specifically, the tension in spokes 22 applies an outwardly directed force on the spoke attachment portions 52 just radially outwardly of the spoke openings 58. In this first embodiment, each reinforcing element 60 is a continuous member. It will be apparent to those skilled in the art from this disclosure that reinforcing elements can be constructed of a plurality of discreet reinforcing ribs that are located adjacent to each of the spoke openings 58, as shown in the latter embodiments. Preferably, the reinforcing elements are located in an area that is approximately 0.5 to approximately 2.0 times the radius of the radial width R of reinforcement members or washers 48. Since the outer diameter or width D of reinforcement members 48 are approximately 8.0 millimeters, the reinforcing elements 60 should be with an area of approximately 8.0 millimeters relative to the spoke openings 58 of the preferred embodiment. If reinforcement members or washers 48 are not used, then the reinforcing elements 60 are located in an area that is approximately 0.5 to approximately 2.0 times the radius of the radial width of the heads 40b of spokes 22.

Figure 8:
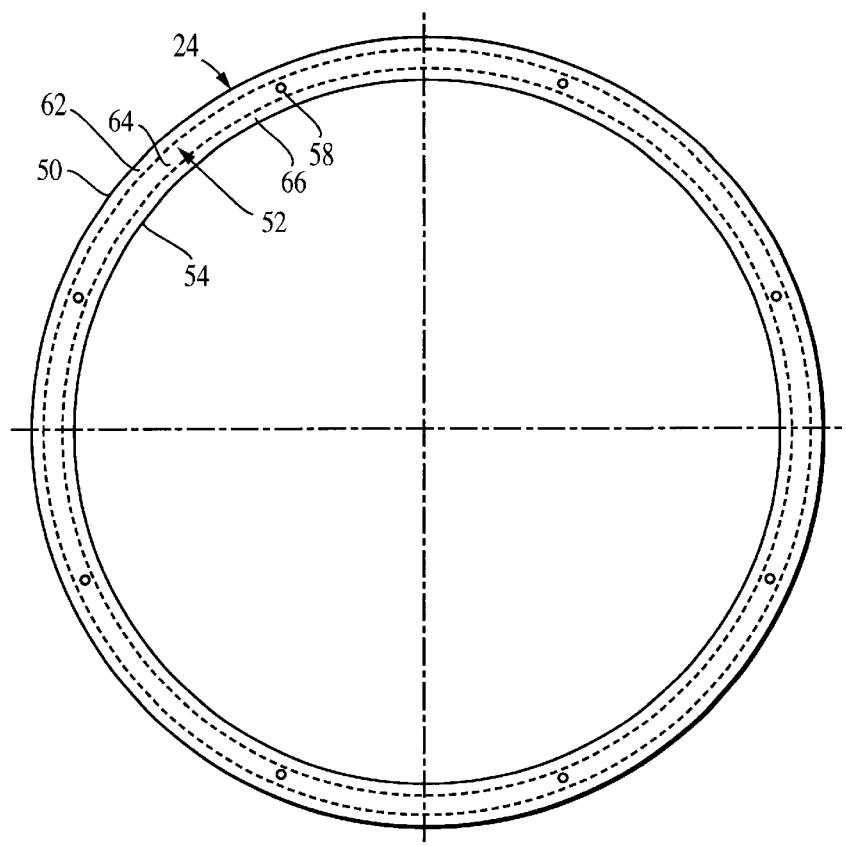
FIG. 8 is a diagrammatic side elevational view of the rim illustrated in FIGS. 1–8 with the arrangement of the outer, middle and inner circumferential sections illustrated by broken lines.
Figures 9, 10:
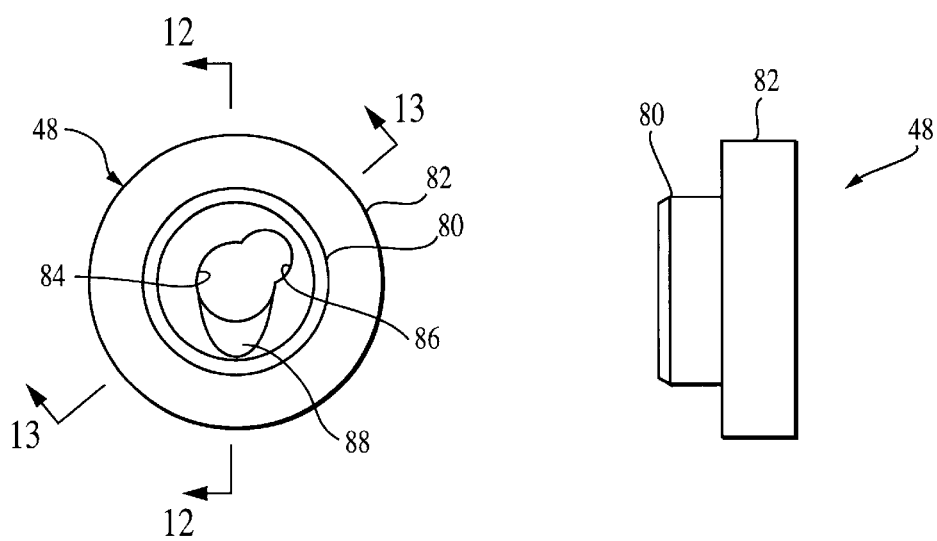
FIG. 9 is an enlarged right side elevational view of one of the reinforcement members or washers in accordance with the present invention.
FIG. 10 is an enlarged edge elevational view of the reinforcement member or washer illustrated in FIG. 9.

As best seen in FIGS. 6 and 8, spoke attachment portions 52 basically have an outer circumferential section 62, a middle circumferential section 64 and an inner circumferential section 66. Middle circumferential section 64 includes the spoke openings 58 and has a predetermined wall thickness that is thicker in the axial direction than the outer circumferential section 62 and the inner circumferential section 66. In the preferred embodiment, outer circumferential section 62 and inner circumferential section 66 has substantially the same predetermined wall thickness. Middle circumferential section 64 preferably has a predetermined wall thickness that is approximately one to two times the diameter or width D of the reinforcement members 48. If reinforcement members or washers 48 are not used, then the reinforcing elements 60 are located in an area that is approximately one to two times the diameter or radial width of the heads 40b of spokes 22.

Referring to FIGS. 5 and 8–11, reinforcement members or washers 48 will now be discussed in more detail. Reinforcement members or washers 48 are designed to disperse the stresses applied to rim 24 by spokes 22. Reinforcement members or washers 48 are preferably disk shaped members with each reinforcement members or washers 48 having a first (smaller) circular stepped portion 80, a second (larger) circular stepped portion 82 and a centrally located spoke hole 84. Preferably, reinforcement members or washers 48 are constructed as one-piece, unitary member.

An example of one suitable material for reinforcement members or washers 48 is aluminum alloy. Of course, other materials can be used. Moreover, reinforcement members or washers 48 can be made of the same material as rim 24 or a different material from rim 24. It will be readily apparent to those skilled in the art from this disclosure that reinforcement members or washers 48 do not have to be stepped as illustrated, but can have other shapes that can carry out the advantages of the present invention.

Preferably, reinforcement members or washers 48 have an axial thickness of approximately 3.7 millimeters. The diameter or width of first (smaller) circular stepped portion 80 is approximately 5.0 millimeters, while the diameter or width of second (larger) circular stepped portion 82 is approximately 8.0 millimeters. The diameters or widths of stepped portions 80 and 82 should be as large as reasonably possible to disperse the stresses on rim 24 from spokes 22. In other words, it is better for the diameters or widths of stepped portions 80 and 82 to be as large as reasonably possible. The axial thickness of first (smaller) circular stepped portion 80 is approximately 1.4 millimeters, while the diameter or width of second (larger) circular stepped portion 82 is approximately 2.3 millimeters. The word approximately as used herein means ±0.1 millimeters.

It will be readily apparent to those skilled in the art from this disclosure that reinforcement members or washers 48 can be made thicker than the thickness of spoke attachment portion 54, or can be the same thickness as the thickness of spoke attachment portion 54.

First circular stepped portion 80 of each reinforcement members or washers 48 can be frictionally retained with in one of the spoke openings 58 of rim 24. Since spokes 22 are placed under tension between hub 20 and rim 24, spokes 22 apply an inward radial force at circumferentially spaced locations that correspond to spoke openings 58. Reinforcement members or washers 48 disperse the stresses on rim 24 from spokes 22. Specifically, first circular stepped portion 80 of each reinforcement members or washers 48 increases the effective diameter or width of spoke 22 to spread out the stresses on the rim 24. Accordingly, the strength of rim 24 is increased without adding thickness to the wall of spoke attachment portion 54.

Spoke holes 84 of reinforcement washers 48 are designed so that spokes 22 can freely pass therethrough. In the illustrated embodiment, the center portions 42 of spokes 22 are elliptical in cross-section. Accordingly, spoke holes 84 have longitudinally extending slots 86 that increase the effective diameter of width of spoke holes 84 to allow the center portions 42 of spokes 22 to pass therethrough.

A slanted cutout or notch 88 is formed on the axial face of first step portion 80. This notch 88 accommodates the bent section 40a of the outer end portion of spoke 22. Preferably, notch 88 is located approximately 135° from slot 86. Thus, when bent section 40a of spoke 22 is seated in notch 88, movement of spoke 22 in spoke hole 84 is limited.

In assembling bicycle wheel 12, reinforcement members 48 are first placed on the outer end portions 40 of spokes 22. Specifically, the inner end portions 44 of spokes 22 are first inserted into spoke holes 84 of reinforcement members or washers 48. Then, the spokes 22 are rotated so that the longer width portion of the elliptical center portions 42 are aligned with slots 86 such that the center portions 42 of spokes 22 can pass through spoke holes 84 of reinforcement members or washers 48. Once the center portions 42 of spokes 22 have passed through spoke holes 84 of reinforcement members or washers 48, the spokes 22 can be further rotated within spoke holes 84 such that the bent section 40a of the spokes 22 are seated in notches 88. The heads 40b of spokes 22 now engage the axial surface of second step portion 82 of reinforcement members or washers 48.

Now, the spokes 22 with reinforcement members or washers 48 thereon can be installed into rim 24. The spokes 22 with reinforcement members or washers 48 are inserted through the access apertures 56 in the outer surface of rim 24 at an angle such that the inner end portions 44 of spokes 22 pass through spoke openings 58. Obviously, access apertures 56 of rim 24 must be sufficiently large in width to accommodate both the spoke 22 and the reinforcement member or washer 48 installed thereon. Once the spokes 22 and washers 48 have fully entered the interior of rim 24, the first stepped portions 80 of reinforcement washers 48 are seated in the spoke openings 58 of rim 24. Preferably, spoke openings 58 are slightly larger than the diameter width of stepped portion 80 such that washers 48 are either loosely received within openings 58 or securely received via interference fit.

Now, the inner end portions 44 of spokes 22 are inserted into openings 34 of hub 20. Spoke nipples or nuts 46 are also inserted into openings 34 and threaded onto the inner end portions 44 of spokes 22. The tension in spokes 22 is then adjusted such that rim 24 is properly positioned about hub 20. The wheel 12 can now be installed on a frame of a bicycle in a conventional manner via hub 20.

SECOND EMBODIMENT

Referring now to FIG. 14, a modified bicycle rim 124 in accordance with the present invention is illustrated. Rim 124 is substantially circular as seen in side elevation. Rim 124 is designed to be used with hub 20 and spokes 22 of the first embodiment. Rim 124 has an outer annular portion 150, a pair of annular spoke attachment portions 152 and an inner annular portion 154. Rim 124 is a so-called deep rim in which the rim's radial height is greater than the rim's axial width.

Spoke attachment portions 152 are located radially inwardly relative to outer annular portion 150 of the rim 124. Each spoke attachment portion 152 has a plurality of circumferentially spaced spoke openings 158 and a plurality of circumferentially spaced reinforcing elements 160 located adjacent spoke openings 158. The spoke openings 158 receive the spokes 22 with reinforcement members or washers 48 therein.

This bicycle rim 124 is substantially identical to bicycle rim 24 discussed above, except that the reinforcing elements 160 of this embodiment are formed by a plurality of discreet members or ribs 160 that are located at each of the spoke openings 158. In view of the similarities between this embodiment and the prior embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 124 will now be discussed. The outer annular portion 150 is adapted to receive a pneumatic tire thereon. Outer annular portion 150 of rim 124 has a plurality of access apertures (not shown) for inserting spokes 22 therethrough and into spoke openings 158 of annular spoke attachment portions 152. Rim 124 is designed to have a pneumatic tire fastened thereto. It will be apparent to those skilled in the art that the shape of rim 124 can be designed for use with "tubular" or "sew-up" type tires which are cemented to outer annular portion 150 or can be designed to accommodate "clinchers" type. Of course, rim 124 can have other shapes to accommodate other types of tires as needed and/or desired without departing from the scope of the present invention. Rim 124 is constructed of a substantially rigid material, such as those materials, which are well known in the art.

The annular spoke attachment portions 152 are located radially inward of outer annular portion 150, with inner annular portion 154 connecting annular spoke attachment portions 152 together. Rim 124 is a tubular member with a hollow, annular inner area.

Spoke openings 158 are preferably equally spaced about the circumference of spoke attachment portions 152. In this embodiment, the plurality of spoke openings 158 are preferably circular openings that are larger than the outer end portions 40 of the spokes 22 therein. Spoke openings 158 of the present invention are larger than conventional spoke openings. Therefore, reinforcement members or washers 48 distribute the forces on rim 124 over a greater area than ordinary round spokes such that stress fracturing and/or tearing of rim 124 is minimized. Preferably, spoke openings 158 have circumferential widths or diameters of at least approximately 5.0 millimeters.

Each spoke opening 158 is located adjacent an access apertures (not shown) so that a spoke 22 with a reinforcement member 48 can be inserted through the access aperture and into the spoke opening 158.

Each of the reinforcing elements 160 is located radially outwardly of the spoke openings 158. Reinforcing elements 160 are located to strengthen the sides of rim 124. Specifically, the tension in spokes 22 applies an outwardly directed force on the spoke attachment portions 152 just radially outwardly of the spoke openings 158. Preferably, the reinforcing elements 160 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 160 should be with an area of approximately 8.0 millimeters relative to the spoke openings 158 of the preferred embodiment.

Similar to the first embodiment, each spoke attachment portions 152 preferably has three circumferential sections, with the middle circumferential section having a predetermined wall thickness that is thicker in the axial direction than the outer and inner circumferential sections. The middle circumferential section includes the spoke openings 158 and has a predetermined wall thickness that is thicker in the axial direction than outer and inner circumferential sections. In the preferred embodiment, the outer and inner circumferential sections have substantially the same predetermined wall thickness. The middle circumferential section preferably has a predetermined wall thickness that is approximately one to two times the diameter or radial width of the reinforcement members 48.

THIRD EMBODIMENT

Figure 15:
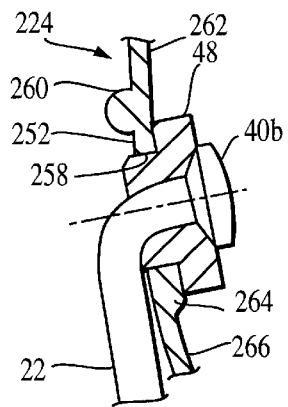
FIG. 15 is a partial, cross-sectional view of a modified bicycle rim in accordance with third embodiment of the present invention.
Figure 16:
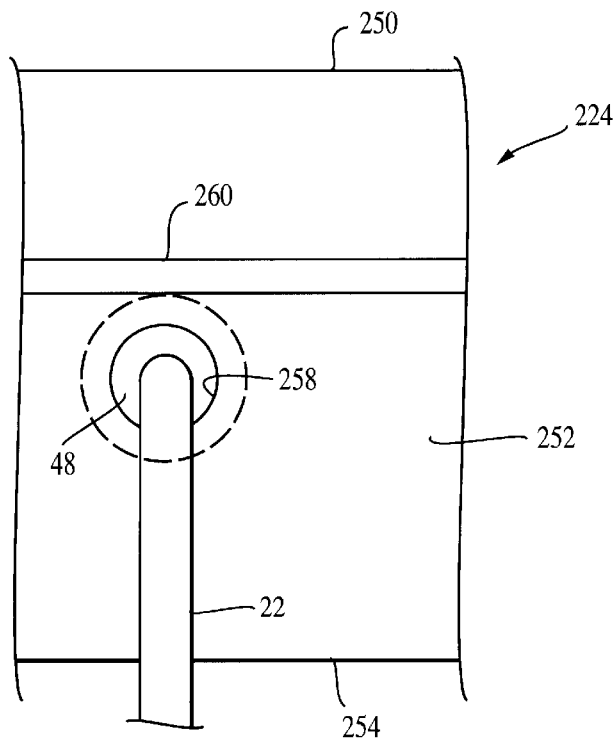
FIG. 16 is a partial, side elevational view of a portion of the modified bicycle rim illustrated in FIG. 15.

Referring to FIGS. 15 and 16, a modified bicycle rim 224 in accordance with another embodiment is illustrated in accordance with the present invention. Rim 224 is substantially circular as seen in side elevation. Rim 224 is designed to be used with hub 20 and spokes 22 of the first embodiment. Rim 224 has an outer annular portion 250, a pair of annular spoke attachment portions 252 and an inner annular portion 254. Rim 224 is a so-called deep rim in which the rim's radial height is greater than the rim's axial width.

Spoke attachment portions 252 are located radially inwardly relative to outer annular portion 250 of the rim 224. Each spoke attachment portion 252 has a plurality of circumferentially spaced spoke openings 258 and a plurality of circumferentially spaced reinforcing elements 260 located adjacent spoke openings 258. The spoke openings 258 receive the spokes 22 with reinforcement members or washers 48 therein.

This rim 224 is substantially identical to the rim 24 of the first embodiment, except that the reinforcing elements or ribs 260 are located on the exterior surfaces of the spoke attachment portions 252 rather than the interior surfaces of the spoke attachment portions 252. The reinforcing elements 260 of this embodiment can be a continuous ring-shaped reinforcing rib as in the first embodiment (FIG. 7) or can be constructed of a plurality of discreet reinforcing elements located at each of the spoke openings as in the second embodiment (FIG. 14) as discussed above. In view of the similarities between this embodiment and the prior embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 224 will now be discussed. The outer annular portion 250 is adapted to receive a pneumatic tire thereon. Outer annular portion 250 of rim 224 has a plurality of access apertures (not shown) for inserting spokes 22 therethrough and into spoke openings 258 of annular spoke attachment portions 252. Rim 224 is designed to have a pneumatic tire fastened thereto. It will be apparent to those skilled in the art that the shape of rim 224 can be designed for use with "tubular" or "sew-up" type tires which are cemented to outer annular portion 250 or can be designed to accommodate "clinchers" type. Of course, rim 224 can have other shapes to accommodate other types of tires as needed and/or desired without departing from the scope of the present invention. Rim 224 is constructed of a substantially rigid material, such as those materials, which are well known in the art.

The annular spoke attachment portions 252 are located radially inward of outer annular portion 250, with inner annular portion 254 connecting annular spoke attachment portions 252 together. Rim 224 is a tubular member with a hollow, annular inner area.

Spoke openings 258 are preferably equally spaced about the circumference of spoke attachment portions 252. In this embodiment, the plurality of spoke openings 258 are preferably circular openings that are larger than the outer end portions 40 of the spokes 22 therein. Spoke openings 258 of the present invention are larger than conventional spoke openings. Therefore, reinforcement members or washers 48 distribute the forces on rim 224 over a greater area than ordinary round spokes such that stress fracturing and/or tearing of rim 224 is minimized. Preferably, spoke openings 258 have circumferential widths or diameters of at least approximately 5.0 millimeters.

Each spoke opening 258 is located adjacent an access apertures (not shown) so that a spoke 22 with a reinforcement member 48 can be inserted through the access aperture and into the spoke opening 258.

Each of the reinforcing elements 260 is located radially outwardly of the spoke openings 258. Reinforcing elements 260 are located to strengthen the sides of rim 224. Specifically, the tension in spokes 22 applies an outwardly directed force on the spoke attachment portions 252 just radially outwardly of the spoke openings 258. Preferably, the reinforcing elements 260 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 260 should be with an area of approximately 8.0 millimeters relative to the spoke openings 258 of the preferred embodiment.

Similar to the first embodiment, each spoke attachment portions 252 preferably has three circumferential sections 262, 264 and 266, with the middle circumferential section 264 having a predetermined wall thickness that is thicker in the axial direction than the outer and inner circumferential sections 262 and 266. The middle circumferential section 264 includes the spoke openings 258 and has a predetermined wall thickness that is thicker in the axial direction than the outer and inner circumferential sections 262 and 266. In the preferred embodiment, the outer and inner circumferential sections 262 and 266 have substantially the same predetermined wall thickness. The middle circumferential section 264 preferably has a predetermined wall thickness that is approximately one to two times the diameter or radial width of the reinforcement members 48.

FOURTH EMBODIMENT

Figure 17:
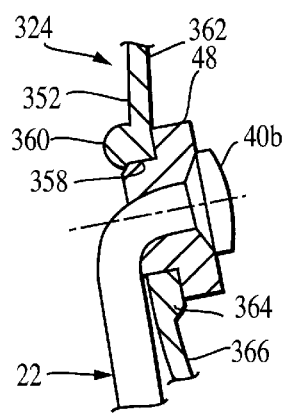
FIG. 17 is a partial, cross-sectional view of a modified bicycle rim in accordance with fourth embodiment of the present invention.
Figure 18:
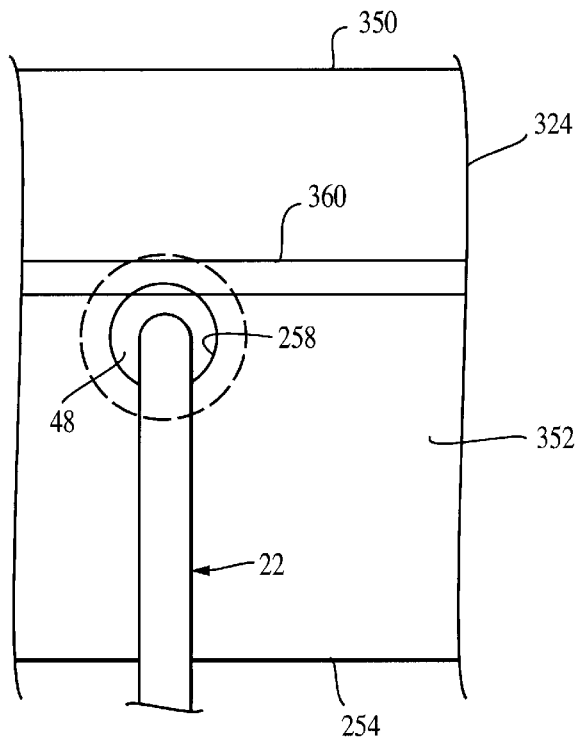
FIG. 18 is a partial, side elevational view of a portion of the modified bicycle rim illustrated in FIG. 17.

Referring now to FIGS. 17 and 18, a modified rim 324 in accordance with another embodiment is illustrated in accordance with the present invention. Rim 324 is substantially circular when viewed side elevation. Rim 324 is designed to be used with hub 20 and spokes 22 of the first embodiment. Rim 324 has an outer annular portion 350, a pair of annular spoke attachment portions 352 and an inner annular portion 354. Rim 324 is a so-called deep rim in which the rim's radial height is greater than the rim's axial width.

Spoke attachment portions 352 are located radially inwardly relative to outer annular portion 350 of the rim 324. Each spoke attachment portion 352 has a plurality of circumferentially spaced spoke openings 358 and a plurality of circumferentially spaced reinforcing elements 360 located adjacent spoke openings 358. The spoke openings 358 receive the spokes 22 with reinforcement members or washers 48 therein.

This rim 324 is substantially identical to the rim 24 of the first embodiment, except for basically two changes. First, the reinforcing elements or ribs 360 are located on the exterior surfaces of the spoke attachment portions 352 rather than the interior surfaces of the spoke attachment portions 352. Second, the reinforcing elements or ribs 360 are located closer to the spoke openings 358. The reinforcing elements 360 of this embodiment can be a continuous ring-shaped reinforcing rib as in the first embodiment (FIG. 7) or can be constructed of a plurality of discreet reinforcing elements located at each of the spoke openings as in the second embodiment (FIG. 14). In view of the similarities between this embodiment and the prior embodiments, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 324 will now be discussed. The outer annular portion 350 is adapted to receive a pneumatic tire thereon. Outer annular portion 350 of rim 324 has a plurality of access apertures (not shown) for inserting spokes 22 therethrough and into spoke openings 358 of annular spoke attachment portions 352. Rim 324 is designed to have a pneumatic tire fastened thereto. It will be apparent to those skilled in the art that the shape of rim 324 can be designed for use with "tubular" or "sew-up" type tires which are cemented to outer annular portion 350 or can be designed to accommodate "clinchers" type. Of course, rim 324 can have other shapes to accommodate other types of tires as needed and/or desired without departing from the scope of the present invention. Rim 324 is constructed of a substantially rigid material, such as those materials, which are well known in the art.

The annular spoke attachment portions 352 are located radially inward of outer annular portion 350, with inner annular portion 354 connecting annular spoke attachment portions 352 together. Rim 324 is a tubular member with a hollow, annular inner area.

Spoke openings 358 are preferably equally spaced about the circumference of spoke attachment portions 352. In this embodiment, the plurality of spoke openings 358 are preferably circular openings that are larger than the outer end portions 40 of the spokes 22 therein. Spoke openings 358 of the present invention are larger than conventional spoke openings. Therefore, reinforcement members or washers 48 distribute the forces on rim 324 over a greater area than ordinary round spokes such that stress fracturing and/or tearing of rim 324 is minimized. Preferably, spoke openings 358 have circumferential widths or diameters of at least approximately 5.0 millimeters.

Each spoke opening 358 is located adjacent an access apertures (not shown) so that a spoke 22 with a reinforcement member 48 can be inserted through the access aperture and into the spoke opening 358.

Each of the reinforcing elements 360 is located radially outwardly of the spoke openings 358. Reinforcing elements 360 are located to strengthen the sides of rim 324. Specifically, the tension in spokes 22 applies an outwardly directed force on the spoke attachment portions 352 just radially outwardly of the spoke openings 358. Preferably, the reinforcing elements 360 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 360 should be with an area of approximately 8.0 millimeters relative to the spoke openings 358 of the preferred embodiment.

Similar to the first embodiment, each of the spoke attachment portions 352 preferably has three circumferential sections 362, 364 and 366, with the middle circumferential section 364 having a predetermined wall thickness that is thicker in the axial direction than the outer and inner circumferential sections 362 and 366. The middle circumferential section 364 includes the spoke openings 358 formed therein. The predetermined wall thickness of the middle circumferential section 364 is thicker in the axial direction than outer and inner circumferential sections 362 and 366. In the preferred embodiment, the outer and inner circumferential sections 362 and 366 have substantially the same predetermined wall thickness. The middle circumferential section 364 preferably has a predetermined wall thickness that is approximately one to two times the diameter or radial width of the reinforcement members 48.

FIFTH EMBODIMENT

Referring now to FIGS. 19–21, a modified bicycle rim 424 in accordance with the present invention is illustrated. Rim 424 is substantially circular as seen in side elevation (FIG. 21). Rim 424 is designed to be used with hub 20 and spokes 22 of the first embodiment. Rim 424 has an outer annular portion 450, a pair of annular spoke attachment portions 452 and an inner annular portion 454. Rim 424 is a so-called deep rim in which the rim's radial height is greater than the rim's axial width.

Spoke attachment portions 452 are located radially inwardly relative to outer annular portion 450 of the rim 424. Each spoke attachment portion 452 has a plurality of circumferentially spaced spoke openings 458 and a reinforcing element 460 located adjacent the spoke openings 458. The spoke openings 458 receive the spokes 22 with reinforcement members or washers 48 therein.

Similar to the first embodiment, each spoke attachment portions 452 preferably has three circumferential sections 462, 464 and 466, with the middle circumferential section 464 having a predetermined wall thickness that is thicker in the axial direction than the outer and inner circumferential sections 462 and 466. The middle circumferential section 464 includes the spoke openings 458 and has a predetermined wall thickness that is thicker in the axial direction than outer and inner circumferential sections 462 and 466. In the preferred embodiment, the outer and inner circumferential sections 462 and 466 have substantially the same predetermined wall thickness. The middle circumferential section 464 preferably has a predetermined wall thickness that is approximately one to two times the diameter or radial width of the reinforcement members 48. Alternatively, the outer and middle circumferential sections 462 and 464 can have the same axial thicknesses, while the inner circumferential section 466 and the inner portion 454 can have the same wall thicknesses that are smaller than the wall thicknesses of the outer and middle circumferential sections 462 and 464.

In this embodiment, the reinforcing elements 460 are formed by bends in each of the spoke attachment portions 452. In this embodiment, the reinforcing elements or bends 460 form a continuous reinforcing element or bend on each of the spoke attachment portions 452. The reinforcing elements 460 provide the spoke attachment portions 452 into two ring-shaped sections that are axially offset from each other relative to the center plane of the bicycle rim 424. Specifically, the bends or reinforcing elements 460 are located between the outer and middle circumferential sections 462 and 464. In this embodiment, the outer ring-shaped or circumferential sections 462 of the spoke attachment portions 452 are spaced axially farther from the center plane of the wheels than the inner ring-shaped sections or middle circumferential sections 464.

Except for the reinforcing elements 460 being formed as bends, rather than ribs, the bicycle rim 424 is substantially identical to bicycle rim 24 discussed above. In view of the similarities between this embodiment and the prior embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 424 will now be discussed. The outer annular portion 450 is adapted to receive a pneumatic tire thereon. Outer annular portion 450 of rim 424 has a plurality of access apertures (not shown) for inserting spokes 22 therethrough and into spoke openings 458 of annular spoke attachment portions 452. Rim 424 is designed to have a pneumatic tire fastened thereto. It will be apparent to those skilled in the art that the shape of rim 424 can be designed for use with "tubular" or "sew-up" type tires which are cemented to outer annular portion 450 or can be designed to accommodate "clinchers" type. Of course, rim 424 can have other shapes to accommodate other types of tires as needed and/or desired without departing from the scope of the present invention. Rim 424 is constructed of a substantially rigid material, such as those materials, which are well known in the art.

The annular spoke attachment portions 452 are located radially inward of outer annular portion 450, with inner annular portion 454 connecting annular spoke attachment portions 452 together. Rim 424 is a tubular member with a hollow, annular inner area.

Spoke openings 458 are preferably equally spaced about the circumference of spoke attachment portions 452. In this embodiment, the plurality of spoke openings 458 are preferably circular openings that are larger than the outer end portions 40 of the spokes 22 therein. Spoke openings 458 of the present invention are larger than conventional spoke openings. Therefore, reinforcement members or washers 48 distribute the forces on rim 424 over a greater area than ordinary round spokes such that stress fracturing and/or tearing of rim 424 is minimized. Preferably, spoke openings 458 have circumferential widths or diameters of at least approximately 5.0 millimeters.

Each spoke opening 458 is located adjacent an access apertures (not shown) so that a spoke 22 with a reinforcement member 48 can be inserted through the access aperture and into the spoke opening 458.

Each of the reinforcing elements 460 is located radially outwardly of the spoke openings 458. Reinforcing elements 460 are located to strengthen the sides of rim 424. Specifically, the tension in spokes 22 applies an outwardly directed force on the spoke attachment portions 452 just radially outwardly of the spoke openings 458. Preferably, the reinforcing elements 460 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 460 should be with an area of approximately 8.0 millimeters relative to the spoke openings 458 of the preferred embodiment.

SIXTH EMBODIMENT

Referring to FIGS. 22 and 23, a modified bicycle rim 524 in accordance with the present invention is illustrated. This embodiment is similar to bicycle rim 424 of the fifth embodiment of the present invention. Rim 524 is substantially circular when viewed in side elevation. Rim 524 is designed to be used with hub 20 and spokes 22 of the first embodiment. Rim 524 has an outer annular portion 550, a pair of annular spoke attachment portions 552 and an inner annular portion 554. Rim 524 is a so-called deep rim in which the rim's radial height is greater than the rim's axial width.

Spoke attachment portions 552 are located radially inwardly relative to outer annular portion 550 of the rim 524. Each spoke attachment portion 552 has a plurality of circumferentially spaced spoke openings 558 and a reinforcing element 560 located adjacent spoke openings 558. The spoke openings 558 receive the spokes 22 with reinforcement members or washers 48 therein.

Similar to the first and fifth embodiments, each spoke attachment portions 552 preferably has three circumferential sections 562, 564 and 566, with the middle circumferential section 564 having a predetermined wall thickness that is thicker in the axial direction than the outer and inner circumferential sections 562 and 566. The middle circumferential section 564 includes the spoke openings 558 and has a predetermined wall thickness that is thicker in the axial direction than outer and inner circumferential sections 562 and 566. In the preferred embodiment, the outer and inner circumferential sections 562 and 566 have substantially the same predetermined wall thickness. The middle circumferential section 564 preferably has a predetermined wall thickness that is approximately one to two times the diameter or radial width of the reinforcement members 48. Alternatively, the outer and middle circumferential sections 562 and 564 can have the same axial thicknesses, while the inner circumferential section 566 and the inner portion 554 can have the same wall thicknesses that are smaller than the wall thicknesses of the outer and middle circumferential sections 562 and 564.

In this embodiment, the reinforcing elements 560 are formed by bends in each of the spoke attachment portions 552. In this embodiment, the reinforcing elements or bends 560 form a continuous reinforcing element or bend on each of the spoke attachment portions 552. The reinforcing elements 560 provide the spoke attachment portions 552 into two ring-shaped sections that are axially offset from each other relative to the center plane of the bicycle rim 524. Specifically, the bends or reinforcing elements 560 are located between the outer and middle circumferential sections 562 and 564. In this embodiment, the outer ring-shaped or circumferential sections 562 of the spoke attachment portions 552 are spaced axially closer to the center plane of the rim 524 than the inner ring-shaped sections or middle circumferential sections 564.

Except for the reinforcing elements 560 being formed as bends, rather than ribs, the bicycle rim 524 is substantially identical to bicycle rim 24 discussed above. In view of the similarities between this embodiment and the prior embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 524 will now be discussed. The outer annular portion 550 is adapted to receive a pneumatic tire thereon. Outer annular portion 550 of rim 524 has a plurality of access apertures (not shown) for inserting spokes 22 therethrough and into spoke openings 558 of annular spoke attachment portions 552. Rim 524 is designed to have a pneumatic tire fastened thereto. It will be apparent to those skilled in the art that the shape of rim 524 can be designed for use with "tubular" or "sew-up" type tires which are cemented to outer annular portion 550 or can be designed to accommodate "clinchers" type. Of course, rim 524 can have other shapes to accommodate other types of tires as needed and/or desired without departing from the scope of the present invention. Rim 524 is constructed of a substantially rigid material, such as those materials, which are well known in the art.

The annular spoke attachment portions 552 are located radially inward of outer annular portion 550, with inner annular portion 554 connecting annular spoke attachment portions 552 together. Rim 524 is a tubular member with a hollow, annular inner area.

Spoke openings 558 are preferably equally spaced about the circumference of spoke attachment portions 552. In this embodiment, the plurality of spoke openings 558 are preferably circular openings that are larger than the outer end portions 40 of the spokes 22 therein. Spoke openings 558 of the present invention are larger than conventional spoke openings. Therefore, reinforcement members or washers 48 distribute the forces on rim 524 over a greater area than ordinary round spokes such that stress fracturing and/or tearing of rim 524 is minimized. Preferably, spoke openings 558 have circumferential widths or diameters of at least approximately 5.0 millimeters.

Each spoke opening 558 is located adjacent an access apertures (not shown) so that a spoke 22 with a reinforcement member 48 can be inserted through the access aperture and into the spoke opening 558.

Each of the reinforcing elements 560 is located radially outwardly of the spoke openings 558. Reinforcing elements 560 are located to strengthen the sides of rim 524. Specifically, the tension in spokes 22 applies an outwardly directed force on the spoke attachment portions 552 just radially outwardly of the spoke openings 558. Preferably, the reinforcing elements 560 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 560 should be with an area of approximately 8.0 millimeters relative to the spoke openings 558 of the preferred embodiment.

SEVENTH EMBODIMENT

Referring now to FIG. 24, a modified bicycle rim 624 in accordance with another embodiment is illustrated in accordance with the present invention. This embodiment is a modified version of the fifth or sixth embodiment of the present invention. Rim 624 is substantially circular when viewed in side elevation. Rim 624 is designed to be used with hub 20 and spokes 22 of the first embodiment. Rim 624 has an outer annular portion 650, a pair of annular spoke attachment portions 652 and an inner annular portion 654. Rim 624 is a so-called deep rim in which the rim's radial height is greater than the rim's axial width.

Spoke attachment portions 652 are located radially inwardly relative to outer annular portion 650 of the rim 624. Each spoke attachment portion 652 has a plurality of circumferentially spaced spoke openings 658 and a plurality of circumferentially spaced reinforcing elements 660 located adjacent spoke openings 658. The spoke openings 658 receive the spokes 22 with reinforcement members or washers 48 therein.

This embodiment is a modified version of the fifth or sixth embodiment of the present invention. Specifically, in this embodiment, the reinforcing element or bends 660 are formed at discreet points along the circumference of each of the spoke attachment portions 652. Specifically, each reinforcing element or bends 660 is located at each of the spoke openings 658 with at least part of the bends or reinforcing elements 660 being located radially and outwardly from the spoke openings 658. Preferably, a portion of each bend 660 extends in a circumferential direction just radially above the spoke openings 658. In the illustrated embodiment, the reinforcing element or bends 660 are U-shaped bends that partially encircle each of the spoke openings 658. Each of the reinforcing element or bends 660 has a circumferential part 660a and a pair of radial parts 660b. The reinforcing element or bends 660 form at discreet points along the circumference of each of the spoke attachment portions 652 that are either offset axially inward or outward relative to the center plane of the rim 624.

Except for the reinforcing elements 660 being formed as U-shaped bends, rather than ribs, the bicycle rim 624 is substantially identical to bicycle rim 24 discussed above. In view of the similarities between this embodiment and the prior embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 624 will now be discussed. The outer annular portion 650 is adapted to receive a pneumatic tire thereon. Outer annular portion 650 of rim 624 has a plurality of access apertures (not shown) for inserting spokes 22 therethrough and into spoke openings 658 of annular spoke attachment portions 652. Rim 624 is designed to have a pneumatic tire fastened thereto. It will be apparent to those skilled in the art that the shape of rim 624 can be designed for use with "tubular" or "sew-up" type tires which are cemented to outer annular portion 650 or can be designed to accommodate "clinchers" type. Of course, rim 624 can have other shapes to accommodate other types of tires as needed and/or desired without departing from the scope of the present invention. Rim 624 is constructed of a substantially rigid material, such as those materials, which are well known in the art.

The annular spoke attachment portions 652 are located radially inward of outer annular portion 650, with inner annular portion 654 connecting annular spoke attachment portions 652 together. Rim 624 is a tubular member with a hollow, annular inner area.

Spoke openings 658 are preferably equally spaced about the circumference of spoke attachment portions 652. In this embodiment, the plurality of spoke openings 658 are preferably circular openings that are larger than the outer end portions 40 of the spokes 22 therein. Spoke openings 658 of the present invention are larger than conventional spoke openings. Therefore, reinforcement members or washers 48 distribute the forces on rim 624 over a greater area than ordinary round spokes such that stress fracturing and/or tearing of rim 624 is minimized. Preferably, spoke openings 658 have circumferential widths or diameters of at least approximately 5.0 millimeters.

Each spoke opening 658 is located adjacent an access apertures (not shown) so that a spoke 22 with a reinforcement member 48 can be inserted through the access aperture and into the spoke opening 658.

Each of the reinforcing elements 660 is located radially outwardly of the spoke openings 658. Reinforcing elements 660 are located to strengthen the sides of rim 624. Specifically, the tension in spokes 22 applies an outwardly directed force on the spoke attachment portions 652 just radially outwardly of the spoke openings 658. Preferably, the reinforcing elements 660 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 660 should be with an area of approximately 8.0 millimeters relative to the spoke openings 658 of the preferred embodiment.

Also similar to the first embodiment, each spoke attachment portions 652 preferably has three circumferential sections, with the middle circumferential section having a predetermined wall thickness that is thicker in the axial direction than the outer and inner circumferential sections. The middle circumferential section includes the spoke openings 658 and has a predetermined wall thickness that is thicker in the axial direction than outer and inner circumferential sections. In the preferred embodiment, the outer and inner circumferential sections have substantially the same predetermined wall thickness. The middle circumferential section preferably has a predetermined wall thickness that is approximately one to two times the diameter or radial width of the reinforcement members 48. Alternatively, the outer and middle circumferential sections can have the same axial thicknesses, while the inner circumferential section and the inner portion can have the same wall thicknesses that are smaller than the wall thicknesses of the outer and middle circumferential sections.

EIGHTH EMBODIMENT

Referring to FIG. 25, a modified bicycle rim 724 in accordance with another embodiment is illustrated in accordance with the present invention. Rim 724 is substantially circular when viewed in side elevation. Rim 724 is designed to be used with hub 20 and spokes 22 of the first embodiment. Rim 724 has an outer annular portion 750, a pair of annular spoke attachment portions 752 and an inner annular portion 754. Rim 724 is a so-called deep rim in which the rim's radial height is greater than the rim's axial width.

Spoke attachment portions 752 are located radially inwardly relative to outer annular portion 750 of the rim 724. Each spoke attachment portion 752 has a plurality of circumferentially spaced spoke openings 758 and a plurality of circumferentially spaced reinforcing elements 760 located adjacent spoke openings 758. The spoke openings 758 receive the spokes 22 with reinforcement members or washers 48 therein.

This embodiment is a modified version of the seventh embodiment of the present invention, except that the shape of the reinforcing elements or bends 760 are annular bends that encircle each of the spoke openings 758 rather than U-shaped bends. Preferably, each of the bends 760 forms the outline of a "T". Of course, it will be readily apparent to those skilled in the art from this disclosure that the shape of the reinforcing elements or bends 760 can be changed or modified to other shapes so long as they reinforce the rim 724 at points that are located radially and outwardly of the spoke openings 758.

Specifically, in this embodiment, the reinforcing element or bends 760 are formed at discreet points along the circumference of each of the spoke attachment portions 752. Specifically, each reinforcing element or bends 760 is located at each of the spoke openings 758. Preferably, a part of each bend extends in a circumferential direction just above the spoke openings 758. In the illustrated embodiment, the reinforcing element or bends 760 are annular bends that encircle each of the spoke openings 758. Each of the reinforcing element or bends 760 has an outer circumferential part 760a, a pair of radial parts 760b and an inner circumferential part 760c. The reinforcing element or bends 760 form at discreet points along the circumference of each of the spoke attachment portions 752 that are either offset axially inward or outward relative to the center plane of the rim 724. In other words, the parts of the rim 724 located within the reinforcing element or bends 760 are either offset axially inward or outward from adjacent portions of the rim 724 relative to the center plane of the rim 724.

Except for the reinforcing elements 760 being formed as bends that encircling the spoke openings 758, rather than ribs, the bicycle rim 624 is substantially identical to bicycle rim 24 discussed above. In view of the similarities between this embodiment and the prior embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 724 will now be discussed. The outer annular portion 750 is adapted to receive a pneumatic tire thereon. Outer annular portion 750 of rim 724 has a plurality of access apertures (not shown) for inserting spokes 22 therethrough and into spoke openings 758 of annular spoke attachment portions 752. Rim 724 is designed to have a pneumatic tire fastened thereto. It will be apparent to those skilled in the art that the shape of rim 724 can be designed for use with "tubular" or "sew-up" type tires which are cemented to outer annular portion 750 or can be designed to accommodate "clinchers" type. Of course, rim 724 can have other shapes to accommodate other types of tires as needed and/or desired without departing from the scope of the present invention. Rim 724 is constructed of a substantially rigid material, such as those materials, which are well known in the art.

The annular spoke attachment portions 752 are located radially inward of outer annular portion 750, with inner annular portion 754 connecting annular spoke attachment portions 752 together. Rim 724 is a tubular member with a hollow, annular inner area.

Spoke openings 758 are preferably equally spaced about the circumference of spoke attachment portions 752. In this embodiment, the plurality of spoke openings 758 are preferably circular openings that are larger than the outer end portions 40 of the spokes 22 therein. Spoke openings 758 of the present invention are larger than conventional spoke openings. Therefore, reinforcement members or washers 48 distribute the forces on rim 724 over a greater area than ordinary round spokes such that stress fracturing and/or tearing of rim 724 is minimized. Preferably, spoke openings 758 have circumferential widths or diameters of at least approximately 5.0 millimeters.

Each spoke opening 758 is located adjacent an access apertures (not shown) so that a spoke 22 with a reinforcement member 48 can be inserted through the access aperture and into the spoke opening 758.

Each of the reinforcing elements 760 is located radially outwardly of the spoke openings 758. Reinforcing elements 760 are located to strengthen the sides of rim 724. Specifically, the tension in spokes 22 applies an outwardly directed force on the spoke attachment portions 752 just radially outwardly of the spoke openings 758. Preferably, the reinforcing elements 760 are located in an area that is approximately 0.5 to approximately 2.0 times the radius of the radial width of reinforcement members or washers 48. In the case where the outer diameters or widths of reinforcement members 48 are approximately 8.0 millimeters, the reinforcing elements 760 should be with an area of approximately 8.0 millimeters relative to the spoke openings 758 of the preferred embodiment.

Similar to the first embodiment, each spoke attachment portions 752 preferably has three circumferential sections, with the middle circumferential section having a predetermined wall thickness that is thicker in the axial direction than the outer and inner circumferential sections. The middle circumferential section includes the spoke openings 758 and has a predetermined wall thickness that is thicker in the axial direction than outer and inner circumferential sections. In the preferred embodiment, the outer and inner circumferential sections have substantially the same predetermined wall thickness. The middle circumferential section preferably has a predetermined wall thickness that is approximately one to two times the diameter or radial width of the reinforcement members 48.

NINTH EMBODIMENT

Figure 28:
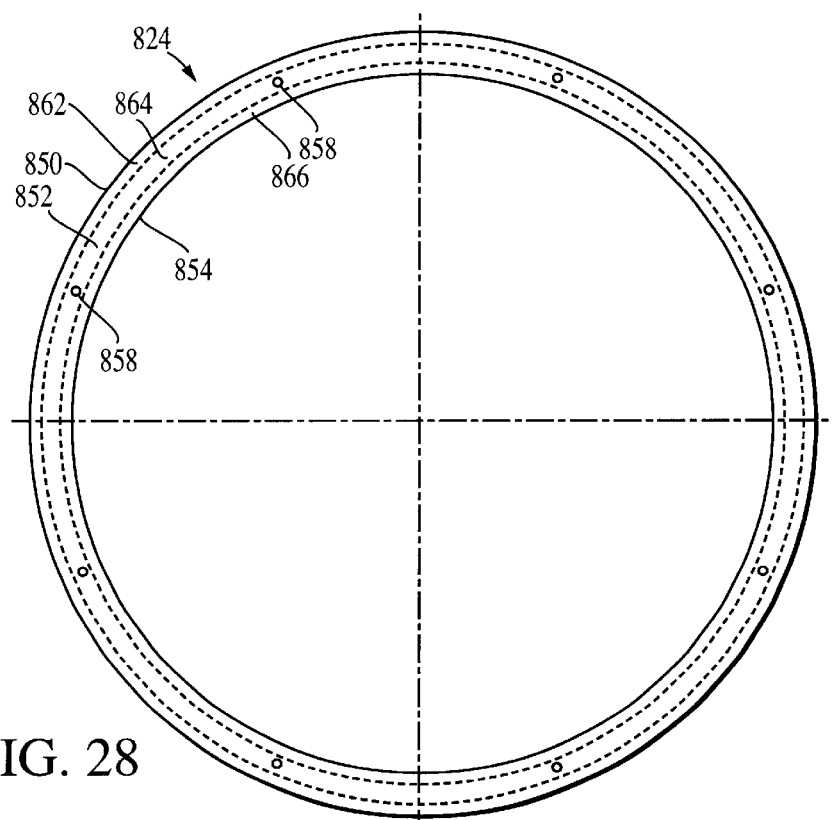
FIG. 28 is a diagrammatic side elevational view of a bicycle rim illustrated in FIGS. 26 and 27 in accordance with another embodiment of the present invention.

Referring to FIGS. 26–28, a modified bicycle rim 824 in accordance with another embodiment is illustrated in accordance with the present invention. Rim 824 is substantially circular as seen in side elevation in FIG. 28. Rim 824 is designed to be used with hub 20 and spokes 22 of the first embodiment. Rim 824 has an outer annular portion 850, a pair of annular spoke attachment portions 852 and an inner annular portion 854. Rim 824 is a so-called deep rim in which the rim's radial height is greater than the rim's axial width.

Spoke attachment portions 852 are located radially inwardly relative to outer annular portion 850 of the rim 824. Each spoke attachment portion 852 has a plurality of circumferentially spaced spoke openings 858. The spoke openings 858 receive the spokes 22 with reinforcement members or washers 48 therein.

This bicycle rim 824 is substantially identical to bicycle rim 24 discussed above, except that the reinforcing elements of this embodiment have been eliminated. In view of the similarities between this embodiment and the first embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 824 will now be discussed. The outer annular portion 850 is adapted to receive a pneumatic tire thereon. Outer annular portion 850 of rim 824 has a plurality of access apertures (not shown) for inserting spokes 22 therethrough and into spoke openings 858 of annular spoke attachment portions 852. Rim 824 is designed to have a pneumatic tire fastened thereto. It will be apparent to those skilled in the art that the shape of rim 824 can be designed for use with "tubular" or "sew-up" type tires which are cemented to outer annular portion 850 or can be designed to accommodate "clinchers" type. Of course, rim 824 can have other shapes to accommodate other types of tires as needed and/or desired without departing from the scope of the present invention. Rim 824 is constructed of a substantially rigid material, such as those materials, which are well known in the art.

The annular spoke attachment portions 852 are located radially inward of outer annular portion 850, with inner annular portion 854 connecting annular spoke attachment portions 852 together. Rim 824 is a tubular member with a hollow, annular inner area.

Spoke openings 858 are preferably equally spaced about the circumference of spoke attachment portions 852. In this embodiment, the plurality of spoke openings 858 are preferably circular openings that are larger than the outer end portions 40 of the spokes 22 therein. Spoke openings 858 of the present invention are larger than conventional spoke openings. Therefore, reinforcement members or washers 48 distribute the forces on rim 824 over a greater area than ordinary round spokes such that stress fracturing and/or tearing of rim 824 is minimized. Preferably, spoke openings 858 have circumferential widths or diameters of at least approximately 5.0 millimeters.

Each spoke opening 858 is located adjacent an access apertures (not shown) so that a spoke 22 with a reinforcement member 48 can be inserted through the access aperture and into the spoke opening 858.

As seen in FIG. 28, similar to the first embodiment, each spoke attachment portions 852 preferably has three circumferential sections 862, 864, 866, with the middle circumferential section 864 having a predetermined wall thickness that is thicker in the axial direction than the outer and inner circumferential sections 862 and 866. The middle circumferential section 864 includes the spoke openings 858 and has a predetermined wall thickness that is thicker in the axial direction than outer and inner circumferential sections 862 and 866. In the preferred embodiment, the outer and inner circumferential sections 862 and 866 have substantially the same predetermined wall thickness. The middle circumferential section 864 preferably has a predetermined wall thickness that is approximately one to two times the diameter or radial width of the reinforcement members 48.

TENTH EMBODIMENT

Figure 29:
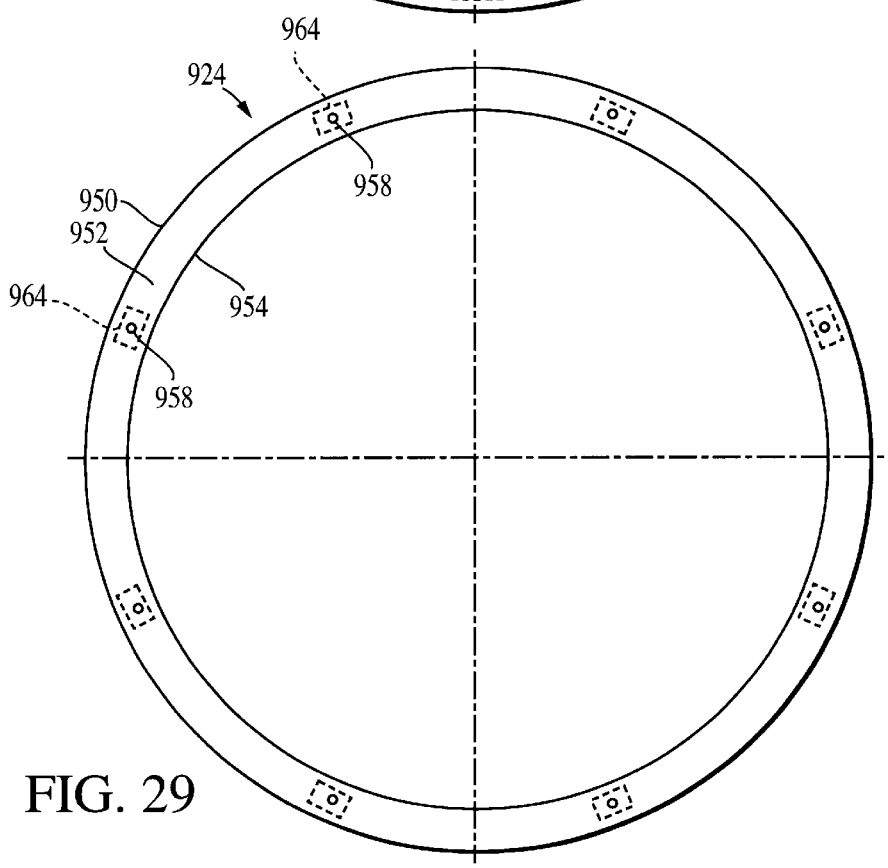
FIG. 29 is a diagrammatic side elevational view of a bicycle rim in accordance with tenth embodiment of the present invention.

Referring to FIG. 29, a modified bicycle rim 924 in accordance with another embodiment is illustrated in accordance with the present invention. Rim 924 is designed to be used with hub 20 and spokes 22 of the first embodiment. Rim 924 has an outer annular portion 950, a pair of annular spoke attachment portions 952 and an inner annular portion 954. Rim 924 is a so-called deep rim in which the rim's radial height is greater than the rim's axial width. Rim 924 is a modified version of the ninth embodiment.

Spoke attachment portions 952 are located radially inwardly relative to outer annular portion 950 of the rim 924. Each spoke attachment portion 952 has a plurality of circumferentially spaced spoke openings 958. The spoke openings 958 receive the spokes 22 with reinforcement members or washers 48 therein.

In this embodiment, each spoke attachment portions 952 preferably has a uniform wall thickness, except at the areas 964 surrounding the spoke openings 958. The areas surrounding the spoke openings 958 have an increased wall thickness in the axial direction relative to the wall thickness of the rest of the spoke attachment portions 952. Preferably, the increase in wall thickness of rim 924 at areas 964 is not noticeable form viewing the exterior surfaces of the spoke attachment portions 952. In the preferred embodiment, the areas 964 have predetermined wall thickness that is approximately one to two times the diameter or radial width of the reinforcement members 48 as compared with the rest of the spoke attachment portions 952.

This bicycle rim 924 is substantially identical to bicycle rim 24 discussed above, except that the reinforcing elements of this embodiment have been eliminated and the use of discreet areas 964 with increased wall thickness. In view of the similarities between this embodiment and the first embodiment, this embodiment will not be discussed or illustrated in detail herein. Moreover, it will be apparent to those skilled in the art from this disclosure that the description the structure of the first embodiment applies to similar and identical parts of this embodiment.

Now some of the basic feature of the bicycle rim 924 will now be discussed. The outer annular portion 950 is adapted to receive a pneumatic tire thereon. Outer annular portion 950 of rim 924 has a plurality of access apertures (not shown) for inserting spokes 22 therethrough and into spoke openings 958 of annular spoke attachment portions 952. Rim 924 is designed to have a pneumatic tire fastened thereto. It will be apparent to those skilled in the art that the shape of rim 924 can be designed for use with "tubular" or "sew-up" type tires which are cemented to outer annular portion 950 or can be designed to accommodate "clinchers" type. Of course, rim 924 can have other shapes to accommodate other types of tires as needed and/or desired without departing from the scope of the present invention. Rim 924 is constructed of a substantially rigid material, such as those materials, which are well known in the art.

The annular spoke attachment portions 952 are located radially inward of outer annular portion 950, with inner annular portion 954 connecting annular spoke attachment portions 952 together. Rim 924 is a tubular member with a hollow, annular inner area.

Spoke openings 958 are preferably equally spaced about the circumference of spoke attachment portions 952. In this embodiment, the plurality of spoke openings 958 are preferably circular openings that are larger than the outer end portions 40 of the spokes 22 therein. Spoke openings 958 of the present invention are larger than conventional spoke openings. Therefore, reinforcement members or washers 48 distribute the forces on rim 924 over a greater area than ordinary round spokes such that stress fracturing and/or tearing of rim 924 is minimized. Preferably, spoke openings 958 have circumferential widths or diameters of at least approximately 5.0 millimeters.

Each spoke opening 958 is located adjacent an access apertures (not shown) formed in the outer annular portion 950 of the rim 924 so that a spoke 22 with a reinforcement member 48 can be inserted through the access aperture and into the spoke opening 958.

While several preferred embodiments have been chosen to illustrate the present invention, it will be readily apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle rim comprising:

an outer annular portion adapted to receive a tire thereon;

first and second annular spoke attachment portions coupled to said outer annular portion and extending radially inwardly of said outer annular portion; and an inner annular portion located radially inwardly of said first and second annular spoke attachment portions and coupling said first and second annular spoke attachment portions together to form a hollow interior, each of said first and second annular spoke attachment portions having an outer circumferential section, a middle circumferential section with a plurality of circunferentially arranged spoke openings formed therein and an inner circumferential section, at least parts of said middle circumferential sections of said first and second annular spoke attachment portions having a first predetermined wall thickness located adjacent said spoke openings, said parts of said middle circumferential sections with said first predetermined wall thickness being located above and below said spoke openings, said first predetermined wall thickness of said parts being greater than a second predetermined wall thickness of said inner circumferential sections of said first and second annular spoke attachment portions.

2. A bicycle rim, comprising:

an outer annular portion adapted to receive a tire thereon;

first and second annular spoke attachment portions coupled to said outer annular portion and extending radially inwardly of said outer annular portion; and an inner annular portion located radially inwardly of said first and second annular spoke attachment portions and coupling said first and second annular spoke attachment portions together to form a hollow interior, each of said first and second annular spoke attachment portions having an outer circumferential section, a middle circumferential section with a plurality of circumferentially arranged spoke openings formed therein and an inner circumferential section, at least parts of said middle circumferential sections of said first and second annular spoke attachment portions having a first predetermined wall thickness located adjacent said spoke openings, said first predetermined wall thickness of said parts being greater than a second predetermined wall thickness of said inner circumferential sections of said first and second annular spoke attachment portions, said parts of said middle circumferential sections with said first predetermined wall thickness extending to form a continuous annular ring along each of said first and second annular spoke attachment portions.

3. A bicycle rim according to claim 2, wherein said annular rings have radial widths of approximately 4.0 millimeters to approximately 16.0 millimeters.

4. A bicycle rim according to claim 3, wherein said annular rings are located above and below said spoke openings.

5. A bicycle rim according to claim 3, wherein said first and second annular spoke attachment portion define a maximum overall axial width of said rim that is smaller than a maximum overall radial height of said rim defined between said outer and inner portions.

6. A bicycle rim according to claim 3, wherein said annular rings are substantially radially centered relative to said spoke openings.

7. A bicycle rim according to claim 2, wherein said first predetermined wall thickness of said parts is at least approximately 1.3 times greater than said second predetermined wall thickness of said inner circumferential sections of said first and second annular spoke attachment portions.

8. A bicycle rim according to claim 2, wherein each of said outer circumferential sections has a third predetermined wall thickness that is substantially equal to said second predetermined wall thicknesses of said inner circumferential sections of said first and second annular spoke attachment portions.

9. A bicycle rim according to claim 1, wherein said parts of said middle circumferential sections with said first predetermined wall thickness are discontinuous and encircle said spoke openings.

10. A bicycle rim according to claim 9, wherein said parts of said middle circumferential sections have radial widths of approximately 4.0 millimeters to approximately 16.0 millimeters.

11. A bicycle rim according to claim 10, wherein said first and second annular spoke attachment portion define a maximum overall axial width of said rim that is smaller than a maximum overall radial height of said rim defined between said outer and inner portions.

12. A bicycle rim according to claim 10, wherein said parts of said middle circumferential sections are substantially radially centered relative to said spoke openings.

13. A bicycle rim according to claim 10, wherein said parts of said middle circumferential sections have circumferential widths of approximately 4.0 millimeters to approximately 16.0 millimeters.

14. A bicycle rim according to claim 10, wherein said first predetermined wall thickness of said parts is at least approximately 1.3 times greater than said second predetermined wall thickness of said inner circumferential sections of said first and second annular spoke attachment portions.

15. A bicycle rim according to claim 10, wherein each of said outer circumferential sections has a third predetermined wall thickness that is substantially equal to said second predetermined wall thicknesses of said inner circumferential sections of said first and second annular spoke attachment portions.

16. A bicycle rim according to claim 1, wherein said first and second annular spoke attachment portion define a maximum overall axial width of said rim that is smaller than a maximum overall radial height of said rim defined between said outer and inner portions.

17. A bicycle rim according to claim 1, wherein said first and second annular spoke attachment portions having reinforcing elements formed adjacent said spoke openings, said reinforcing elements being located radially outwardly from said spoke openings between said outer annular portion and from said spoke openings.

18. A bicycle rim according to claim 17, wherein said reinforcing elements extend continuously along said first and second annular spoke attachment portions.

19. A bicycle rim according to claim 17, wherein a plurality of said reinforcing elements are formed on each of said first and second annular spoke attachment portions in a discontinuous pattern.

20. A bicycle rim according to claim 17, wherein said reinforcing elements are formed by ribs that increase wall thicknesses of said first and second annular spoke attachment portions.

21. A bicycle rim according to claim 17, wherein said reinforcing elements are formed by continuous annular bends along said first and second annular spoke attachment portions that divide said first and second annular spoke attachment portions into inner and outer ring shaped sections.

22. A bicycle wheel assembly comprising:

a plurality of outwardly extending spokes with each of said spokes having an inner end portion, an outer end portion, and a center portion located between said inner and outer end portions, each of said outer end portions of said spokes having an enlarged head member; and a rim having an outer annular portion adapted to receive a tire thereon, first and second annular spoke attachment portions coupled to said outer annular portion and extending radially inwardly of said outer annular portion, and an inner annular portion located radially inwardly of said first and second annular spoke attachment portions and coupling said first and second annular spoke attachment portions together to form a hollow interior, each of said first and second annular spoke attachment portions having an outer circumferential section, a middle circumferential section with a plurality of circumferentially arranged spoke openings formed therein and an inner circumferential section, at least parts of said middle circumferential sections of said first and second annular spoke attachment portions having a first predetermined wall thickness located adjacent said spoke openings, said parts of said middle circumferential sections with said first predetermined wall thickness being located above and below said spoke openings, said first predetermined wall thickness of said parts being greater than a second predetermined wall thickness of said inner circumferential sections of said first and second annular spoke attachment portions.

23. A bicycle wheel assembly, comprising:

a plurality of outwardly extending spokes with each of said spokes having an inner end portion, an outer end portion, and a center portion located between said inner and outer end portions, each of said outer end portions of said spokes having an enlarged head member; and a rim having an outer annular portion adapted to receive a tire thereon, first and second annular spoke attachment portions coupled to said outer annular portion and extending radially inwardly of said outer annular portion, and an inner annular portion located radially inwardly of said first and second annular spoke attachment portions and coupling said first and second annular spoke attachment portions together to form a hollow interior, each of said first and second annular spoke attachment portions having an outer circumferential section, a middle circumferential section with a plurality of circumferentially arranged spoke openings formed therein and an inner circumferential section, at least parts of said middle circumferential sections of said first and second annular spoke attachment portions having a first predetermined wall thickness located adjacent said spoke openings, said first predetermined wall thickness of said parts being greater than a second predetermined wall thickness of said inner circumferential sections of said first and second annular spoke attachment portions, said parts of said middle circumferential sections with said first predetermined wall thickness extending to form a continuous annular ring along each of said first and second annular spoke attachment portions.

24. A bicycle wheel assembly according to claim 23, wherein said annular rings have radial widths of approximately 4.0 millimeters to approximately 16.0 millimeters.

25. A bicycle wheel assembly according to claim 24, wherein said first and second annular spoke attachment portion define a maximum overall axial width of said rim that is smaller than a maximum overall radial height of said rim defined between said outer and inner portions.

26. A bicycle wheel assembly according to claim 25, wherein said annular rings are substantially radially centered relative to said spoke openings.

27. A bicycle wheel assembly according to claim 23, wherein said first predetermined wall thickness of said parts is at least approximately 1.3 times greater than said second predetermined wall thickness of said inner circumferential sections of said first and second annular spoke attachment portions.

28. A bicycle wheel assembly according to claim 23, wherein each of said outer circumferential sections has a third predetermined wall thickness that is substantially equal to said second predetermined wall thicknesses of said inner circumferential sections of said first and second annular spoke attachment portions.

29. A bicycle wheel assembly according to claim 22, wherein said parts of said middle circumferential sections with said first predetermined wall thickness are discontinuous and encircle said spoke openings.

30. A bicycle wheel assembly according to claim 29, wherein said parts of said middle circumferential sections have radial widths of approximately 4.0 millimeters to approximately 16.0 millimeters.

31. A bicycle wheel assembly according to claim 30, wherein said first and second annular spoke attachment portion define a maximum overall axial width of said rim that is smaller than a maximum overall radial height of said rim defined between said outer and inner portions.

32. A bicycle wheel assembly according to claim 30, wherein said parts of said middle circumferential sections are substantially radially centered relative to said spoke openings.

33. A bicycle wheel assembly according to claim 30, wherein said parts of said middle circumferential sections have circumferential widths of approximately 4.0 millimeters to approximately 16.0 millimeters.

34. A bicycle wheel assembly according to claim 30, wherein said first predetermined wall thickness of said parts is at least approximately 1.3 times greater than said second predetermined wall thickness of said inner circumferential sections of said first and second annular spoke attachment portions.

35. A bicycle wheel assembly according to claim 30, wherein each of said outer circumferential sections has a third predetermined wall thickness that is substantially equal to said second predetermined wall thicknesses of said inner circumferential sections of said first and second annular spoke attachment portions.

36. A bicycle wheel assembly according to claim 22, wherein said first and second annular spoke attachment portion define a maximum overall axial width of said rim that is smaller than a maximum overall radial height of said rim defined between said outer and inner portions.

37. A bicycle wheel assembly according to claim 22, wherein said first and second annular spoke attachment portions having reinforcing elements formed adjacent said spoke openings, said reinforcing elements being located radially outwardly from said spoke openings between said outer annular portion and from said spoke openings.

38. A bicycle wheel assembly according to claim 37, wherein said reinforcing elements extend continuously along said first and second annular spoke attachment portions.

39. A bicycle wheel assembly according to claim 37, wherein a plurality of said reinforcing elements are formed on each of said first and second annular spoke attachment portions in a discontinuous pattern.

40. A bicycle wheel assembly according to claim 37, wherein said reinforcing elements are formed by ribs that increase wall thicknesses of said first and second annular spoke attachment portions.

41. A bicycle wheel assembly according to claim 37, wherein said reinforcing elements are formed by continuous annular bends along said first and second annular spoke attachment portions that divide said first and second annular spoke attachment portions into inner and outer ring shaped sections.

42. A bicycle wheel assembly according to claim 22, further comprising a plurality of reinforcement members with each of said reinforcement members having a spoke hole, said outer end portions of said spokes being located in said spoke holes.

43. A bicycle wheel assembly according to claim 42, wherein said reinforcement members have a first portion with a first radial width and a second portion with a second radial width that is larger than said first radial width, said first portions being located within said spoke openings of said annular rim.

44. A bicycle wheel assembly according to claim 43, further comprising said parts of said middle circumferential sections of said first and second annular spoke attachment portions have circumferential widths of approximately one to approximately two times said first radial width of said first portions.

* * * * *